(12) United States Patent  (10) Patent No.: US 8,414,046 B2
Pencak et al.  (45) Date of Patent: Apr. 9, 2013

(54) REINFORCED VEHICLE STRUCTURE

(75) Inventors: Jeffrey Pencak, Howell, MI (US);
Matthew Mollick, Novi, MI (US);
Robert Blanchard, Fenton, MI (US);
Dan Hustyi, Waterford, MI (US)

(73) Assignee: Nissan North America, Inc., Franklin, TN (US)

( * ) Notice: Subject to any disclaimer, the term of this patent is extended or adjusted under 35 U.S.C. 154(b) by 211 days.

(21) Appl. No.: 12/950,717

(22) Filed: Nov. 19, 2010

(65) Prior Publication Data
US 2012/0126576 A1 May 24, 2012

(51) Int. Cl.
*B60R 7/08* (2006.01)
(52) U.S. Cl. ........... 296/24.3; 296/24.44; 296/203.03
(58) Field of Classification Search ........... 296/24.4, 296/24.43, 24.44, 24.45, 3, 193.05, 203.03, 296/203.04, 37.1, 37.6, 37.13, 37.16; 224/402–405, 224/539, 540, 543, 545, 555
See application file for complete search history.

(56) References Cited

U.S. PATENT DOCUMENTS

| 2,755,747 | A |   | 7/1956  | Oakley |
|---|---|---|---|---|
| 4,191,436 | A |   | 3/1980  | Cherry |
| 4,229,132 | A |   | 10/1980 | Taylor |
| 4,514,008 | A | * | 4/1985  | Watanabe et al. ............ 296/204 |
| 4,621,856 | A | * | 11/1986 | McKenzie .................. 296/24.4 |
| 4,738,480 | A | * | 4/1988  | Ward ....................... 296/24.43 |
| 5,027,570 | A | * | 7/1991  | Mitchell et al. ............... 52/210 |
| 5,139,300 | A | * | 8/1992  | Carriere ...................... 296/39.1 |
| 5,192,176 | A | * | 3/1993  | Roberts ....................... 410/140 |
| 5,306,064 | A | * | 4/1994  | Padovano et al. ......... 296/24.44 |
| 5,419,610 | A |   | 5/1995  | Enning et al. |
| 5,478,116 | A |   | 12/1995 | Jarocki et al. |
| 5,660,427 | A |   | 8/1997  | Freeman et al. |
| 5,842,719 | A |   | 12/1998 | Tanaka |
| 5,845,952 | A | * | 12/1998 | Albertini et al. ............ 296/37.6 |
| 5,897,154 | A | * | 4/1999  | Albertini et al. ............ 296/37.6 |
| 6,189,945 | B1 | * | 2/2001 | Rockett ....................... 296/37.6 |
| 6,270,137 | B1 | * | 8/2001 | Minix et al. ................ 296/24.3 |
| 6,270,138 | B1 | * | 8/2001 | Laskowski et al. ....... 296/24.44 |
| 6,386,610 | B1 | * | 5/2002 | Butzke ..................... 296/24.45 |
| 6,846,140 | B2 |   | 1/2005 | Anderson et al. |
| 6,848,732 | B2 | * | 2/2005 | Green ....................... 296/24.33 |
| 6,863,328 | B2 | * | 3/2005 | Kiester et al. .............. 296/37.6 |
| 6,932,407 | B2 |   | 8/2005 | Cuerrier et al. |
| 7,077,448 | B2 | * | 7/2006 | Maeshima et al. .......... 296/37.2 |
| 7,097,204 | B2 | * | 8/2006 | Jessup et al. ................ 280/748 |
| 7,261,044 | B2 |   | 8/2007 | Creighton et al. |
| 7,318,614 | B2 |   | 1/2008 | Steiger et al. |

(Continued)

FOREIGN PATENT DOCUMENTS

JP 2000-062648 A 2/2000
JP 2000-344160 A 12/2000

*Primary Examiner* — Glenn Dayoan
*Assistant Examiner* — Gregory Blankenship
(74) *Attorney, Agent, or Firm* — Global IP Counselors, LLP

(57) ABSTRACT

A reinforced vehicle structure includes a vehicle wall, a reinforcement member, an accessory attachment member and a plurality of mounting structures. The vehicle wall includes an outer wall surface facing an outboard direction of the vehicle and an inner wall surface facing an inboard direction of the vehicle. The reinforcement member is mounted to the outer wall surface. The accessory attachment member is mounted to the inner wall surface. In addition, the plurality of mounting structures is spaced along the reinforcement member and extends through the vehicle wall to couple the accessory attachment member to the reinforcement member.

20 Claims, 33 Drawing Sheets

U.S. PATENT DOCUMENTS

| | | | |
|---|---|---|---|
| 7,364,225 B2 * | 4/2008 | Tomioka | 296/203.04 |
| 7,431,339 B2 | 10/2008 | Yamamoto | |
| 7,641,253 B2 * | 1/2010 | Steiger et al. | 296/24.4 |
| 7,731,255 B2 * | 6/2010 | McJunkin | 296/24.4 |
| 7,784,885 B2 * | 8/2010 | Steiger et al. | 312/107 |
| 7,806,467 B2 * | 10/2010 | Sangu | 296/203.04 |
| 7,909,379 B2 * | 3/2011 | Winget et al. | 296/24.43 |
| 7,946,457 B2 * | 5/2011 | Kramer | 224/405 |
| 7,959,217 B2 * | 6/2011 | Onuma | 296/187.12 |
| 2002/0024227 A1 * | 2/2002 | Kim | 296/24.1 |
| 2005/0225108 A1 * | 10/2005 | Panasewicz et al. | 296/24.44 |
| 2006/0208537 A1 * | 9/2006 | Dingman et al. | 296/193.05 |
| 2006/0255609 A1 * | 11/2006 | Squyres et al. | 296/24.44 |
| 2007/0069542 A1 * | 3/2007 | Steiger et al. | 296/24.44 |
| 2008/0012372 A1 * | 1/2008 | Squyres et al. | 296/24.44 |
| 2011/0057468 A1 * | 3/2011 | Denton et al. | 296/37.16 |

* cited by examiner

REINFORCED VEHICLE STRUCTURE

BACKGROUND

1. Field of the Invention

The present invention generally relates to a reinforced vehicle structure. More particularly, the present invention relates to a reinforced vehicle structure for securing a vehicle accessory, such as a shelving arrangement, in a cargo area of a vehicle.

2. Background Information

Reinforcement components are often used in vehicles to increase the durability or rigidity of the vehicle body structure. For example, a reinforcement component may include an additional layer of material or a thickened component in an area where forces appear to be particularly concentrated, or in an area of particular importance where enhanced stress resistance is desired. Vehicle bodies are also sometimes manufactured to include prefabricated attachment points. Such attachment points may be utilized, for example, as tie-down locations in order to more reliably and efficiently secure cargo.

Prefabricated attachment points may also be included in a vehicle design to give customers the ability to add permanent custom equipment or components, which may be sold as dealer-installed accessories or added by aftermarket up-fitters. For example, such an attachment point may comprise a nut weld, which can be an accessible threaded aperture including a nut that is welded to the opposite-facing side of a body panel. However, the addition of equipment and components to vehicles after the vehicles leave the factory can impose increased stresses and fatigue on the vehicle body structures, which may not have been accounted for in the initial design of the vehicles. This is especially relevant at attachment points in the vehicle body structure, where forces imposed by equipment and components are often concentrated.

SUMMARY

In view of the state of the known technology, one aspect of the present invention is directed to various features of a reinforced vehicle structure including a vehicle wall, a reinforcement member, an accessory attachment member and a plurality of mounting structures. The vehicle wall includes an outer wall surface facing an outboard direction of a vehicle including the reinforced vehicle structure and an inner wall surface facing an inboard direction of the vehicle. The reinforcement member is mounted to the outer wall surface. The accessory attachment member is mounted to the inner wall surface. In addition, the plurality of mounting structures is spaced along the reinforcement member and extends through the vehicle wall to couple the accessory attachment member to the reinforcement member.

BRIEF DESCRIPTION OF THE DRAWINGS

Referring now to the attached drawings which form a part of this original disclosure.

DETAILED DESCRIPTION OF EMBODIMENTS

Figure 1:
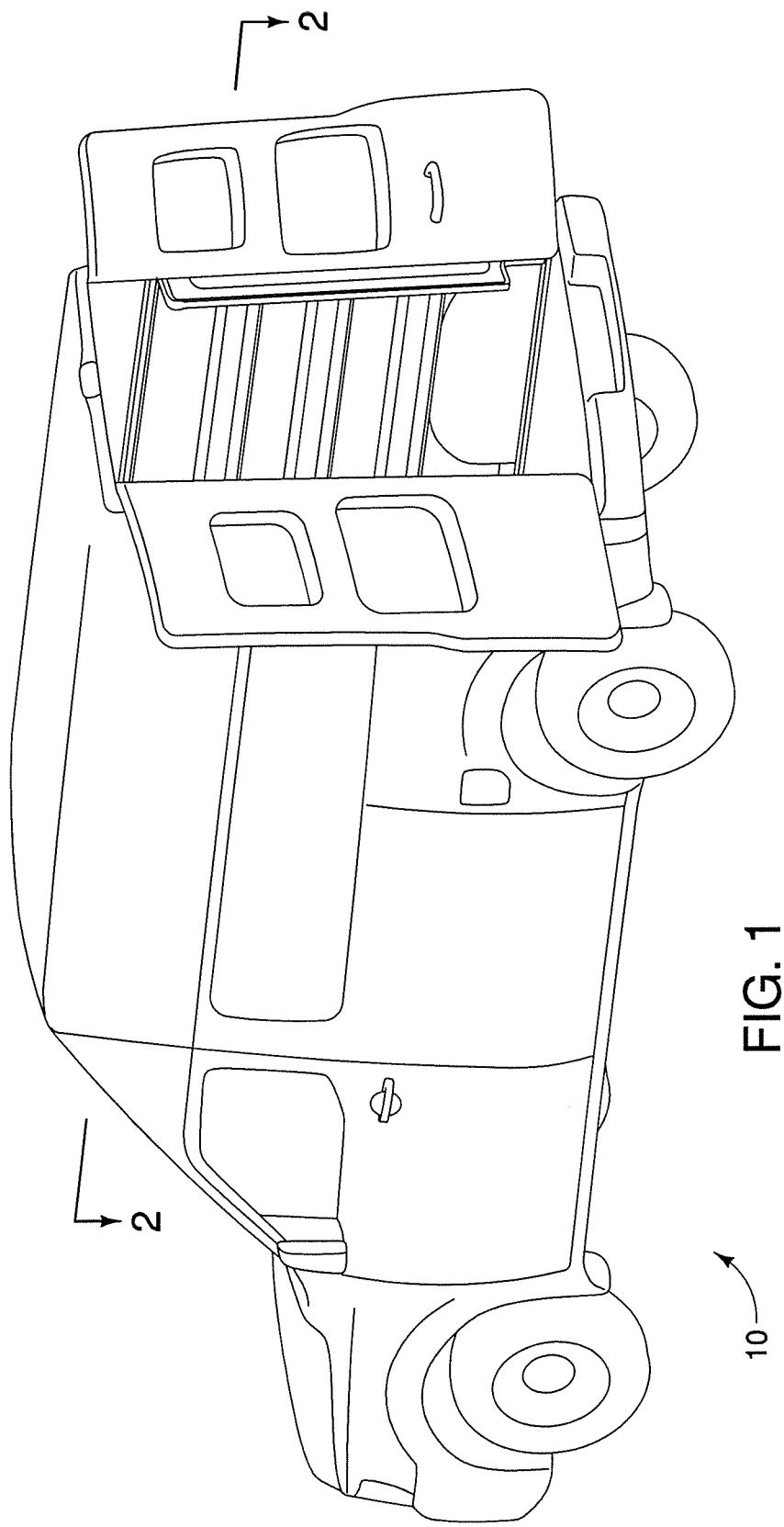
FIG. 1 is an exterior perspective view of a vehicle that has a reinforced vehicle structure in accordance with an illustrated embodiment.
Figure 2:
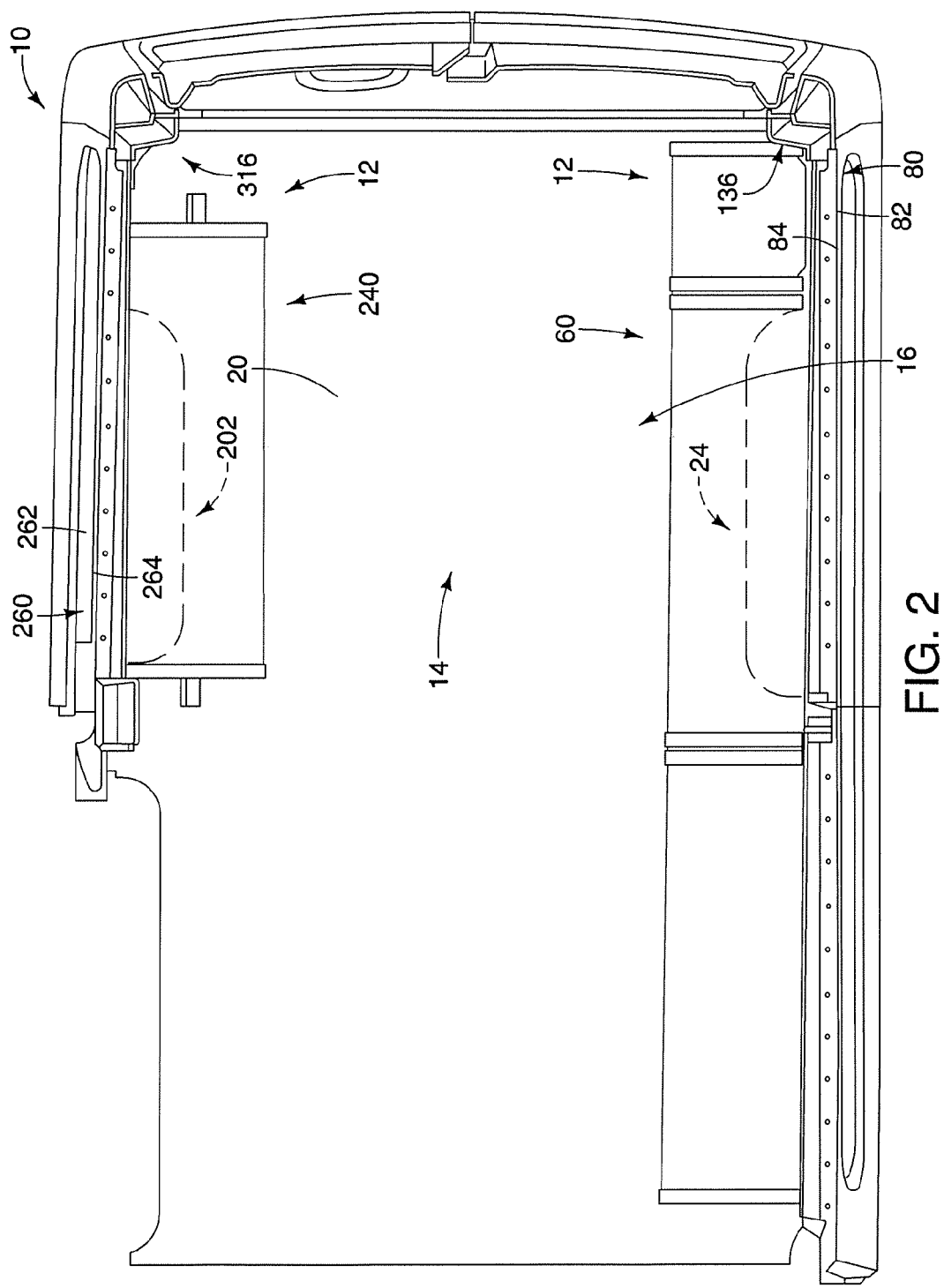
FIG. 2 is a cross-sectional plan view of the vehicle taken along lines 2-2 in FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-8, a vehicle 10 includes a reinforced vehicle structure 12. The reinforced vehicle structure 12 in this example is configured in the cargo compartment 14 at the rear interior driver side of the vehicle 10 and at the rear interior passenger side of the vehicle 10. However, the reinforced vehicle structure 12 can be present at either the rear interior driver side or the rear interior passenger side, or at any other suitable location within the interior of the vehicle 10.

As shown in FIGS. 2, 3 and 5-8, a portion of the reinforced vehicle structure 12 located at the rear interior driver side of the vehicle 10 includes a vehicle floor 16 having an underbody floor surface 18 facing an underbody of the vehicle 10 and an interior floor surface 20 facing an interior of the vehicle 10. The vehicle floor 16 is made of a metal typically used in automotive manufacture or any other suitable material. A reinforcement member 22 is mounted to the underbody floor surface 18 by welding, riveting, screws, or any other suitable fasteners. The reinforcement member 22 is also made of a metal that can be the same as the metal of vehicle floor 16, or any other suitable metal or material.

In this example, the reinforcement member 22 is mounted proximate to a wheel well opening 24 in the vehicle floor 16. As shown, for example, in FIGS. 5-9, the vehicle floor 16 has a first shaped edge 26 having a first shape defining the wheel well opening 24. Similarly, the reinforcement member 22 has a second shaped edge 28 having a second shape, with a portion of the second shape substantially corresponding to the first shape. Moreover, a portion of the underbody floor surface 18 of the vehicle floor 16 has a first shape and the reinforcement member 22 has a second shape substantially corresponding to the first shape to enable the reinforcement member 22 to mate with the portion of the underbody floor surface 18 when the reinforcement member 22 is mounted to the underbody floor surface 18.

Figure 8:
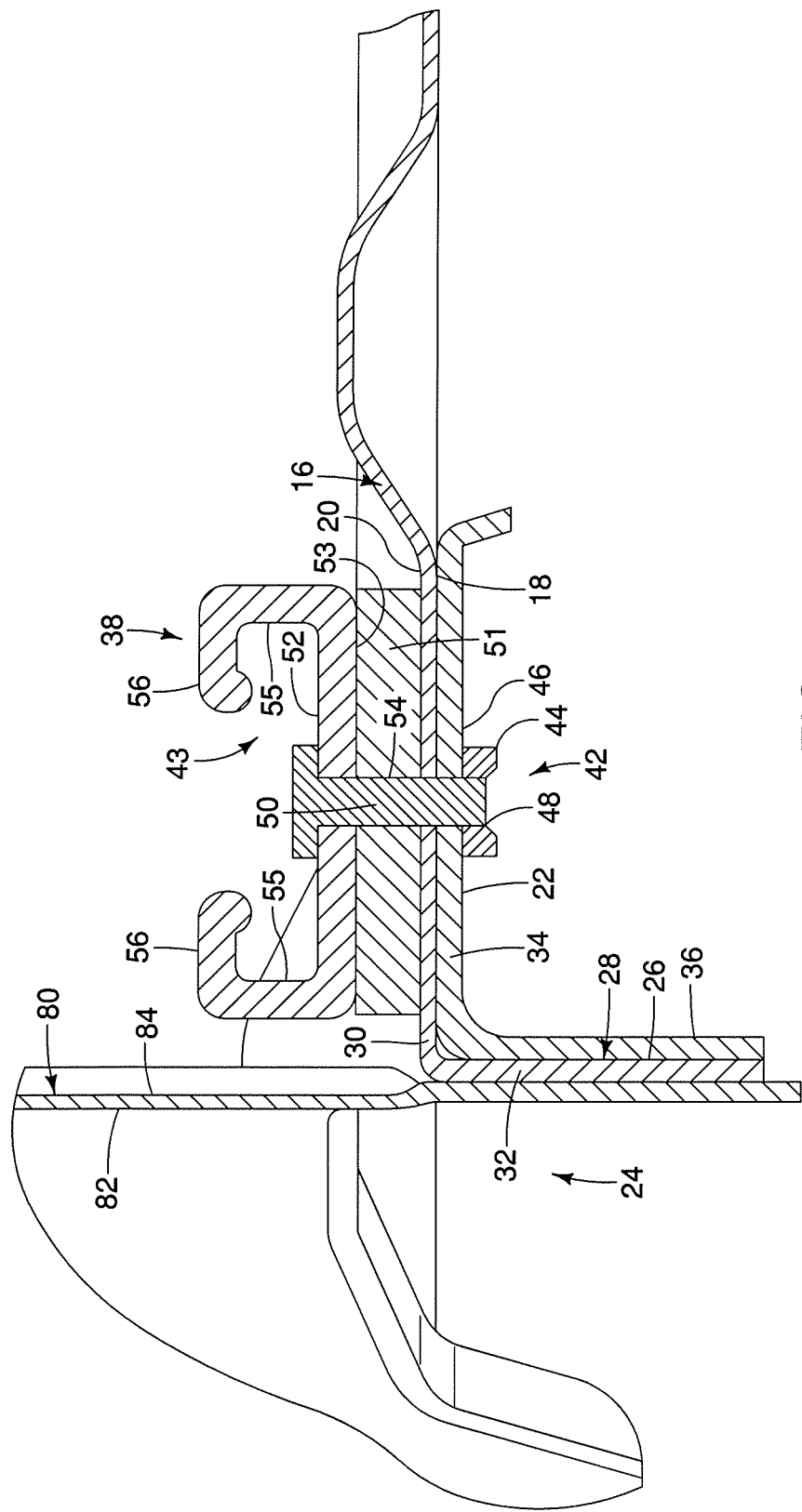
FIG. 8 is a cross-sectional view taken along lines 8-8 in FIG. 7.
Figure 9:
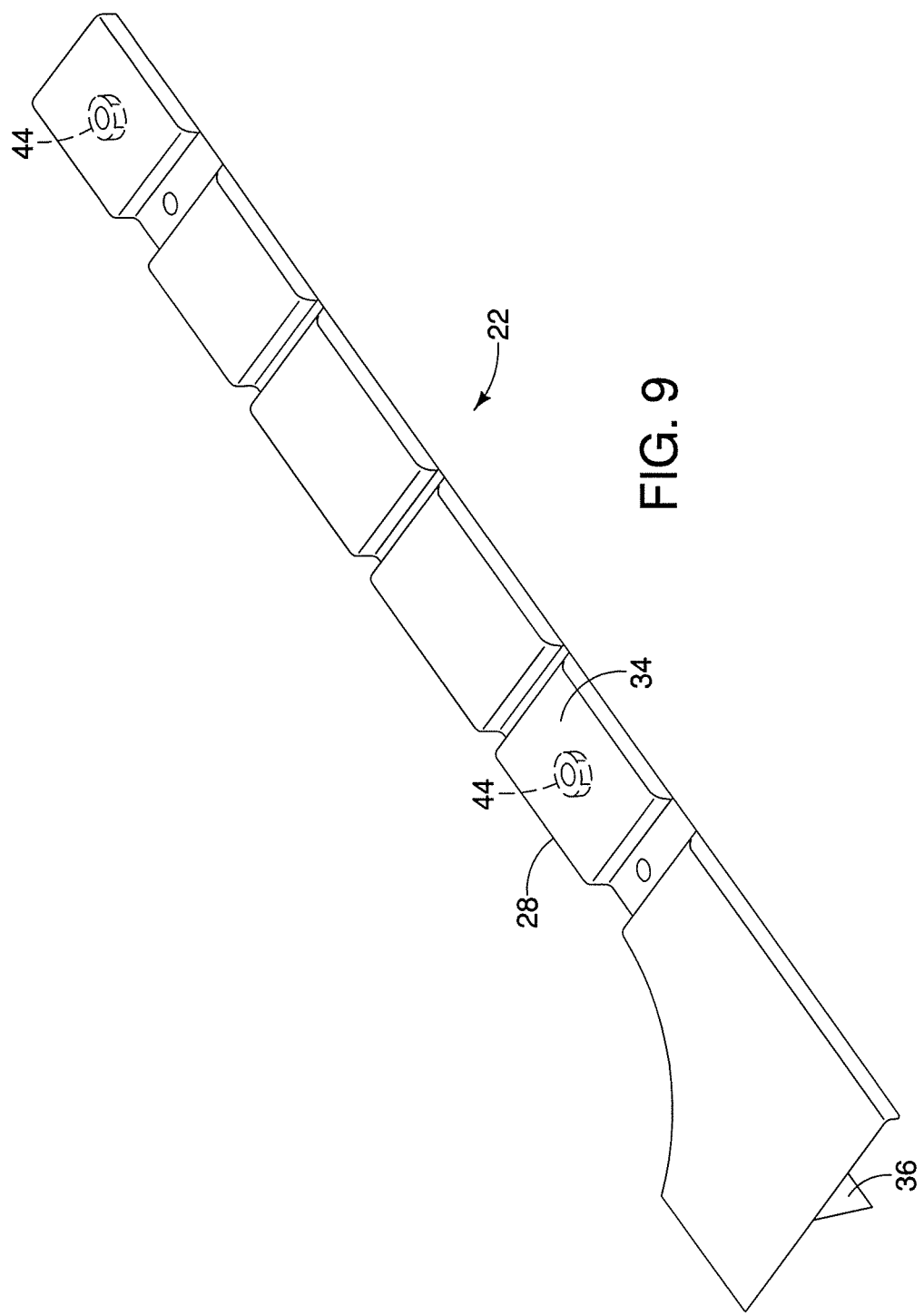
FIG. 9 is a perspective view of a reinforcement member mounted at the rear driver side of the vehicle as shown in FIGS. 6-8.

That is, as shown in FIG. 8, in particular, the vehicle floor 16 includes a lateral floor portion 30 that includes the interior and underbody floor surfaces 20 and 18, and a floor flange 32 extending downward from the lateral floor portion 30. The reinforcement member includes a lateral reinforcement portion 34 and a reinforcement flange 36 extending downward from the lateral reinforcement portion 34. Accordingly, the lateral reinforcement portion 34 and reinforcement flange 36 are positioned proximate to the lateral floor portion 30 and floor flange 32, respectively, when the reinforcement member 22 is mounted to the underbody floor surface 18 of the vehicle floor 16. However, the reinforcement member 22 can be mounted at any other suitable location along the vehicle floor 16.

An accessory attachment member 38 is mounted to the interior floor surface 20. That is, as discussed above, the vehicle 10 includes a cargo compartment 14. The accessory attachment member 38 is mounted inside the cargo compartment 14 to the interior floor surface 20 of the vehicle floor 16. The accessory attachment member 38 is made of a metal, such as that of vehicle floor 16 or reinforcement member 22, or any other suitable metal or material. In this example, the accessory attachment member 38 has a width W1 extending in a lateral direction of the vehicle 10, and the reinforcement member 22 has a width W2 extending in the lateral direction that is greater than the first width W1 as shown, for example, in FIG. 5. Furthermore, the reinforcement member 22 has a length L1 extending in a lengthwise direction of the vehicle 10, and the accessory attachment member 38 has a length L2 extending in the lengthwise direction that is greater than the length L1. In this example, the vehicle floor 16 further includes at least one support member 40 having a length extending in a lateral direction of the vehicle 10, and at least one support member 41 having a length extending in a lengthwise direction of the vehicle 10. In this example, the accessory attachment member 38 extends along the interior floor surface 20 over the support member 40 and is at least partially supported by the support member 40 or members 40. Also, the accessory attachment member 38 has a C-shaped cross-section in this example forming a recess channel 43, but can have any desired cross-section.

In this example, a plurality of mounting structures 42 are spaced along the reinforcement member 22 and extend through the vehicle floor 16 to couple the accessory attachment member 38 to the reinforcement member 22. At least one of the mounting structures 42 includes a welded member 44 that is attached by a weld to a surface 46 of the reinforcement member 22 facing away from the vehicle floor 16, and aligned with a fastening aperture 48 formed in the reinforcement member 22 through which a portion 50 of the at least one of the mounting structures 40 passes. In this example, the portion 50 can include a screw that threadedly engages with the welded member 44. Alternatively, the portion 50 can include rivets or any other suitable fasteners. Furthermore, a spacer 51 can be present between the bottom surface 53 of the accessory attachment member 38 and interior floor surface 20 as indicated to position the accessory attachment member 38 at the appropriate height above the interior floor surface 20. The portion 50 of the mounting structure 42 passes through an opening 54 in the spacer 51. The spacer 51 can be arranged as individual spacers present at each of the mounting structure locations, or a continuous spacer that extends along all or a portion of the accessory attachment member 38 and has openings through which the respective portions 50 of the mounting structure 42 can pass.

Since the accessory attachment member 38 has a C-shaped cross section in this example, the accessory attachment member 38 has a horizontally extending portion 52 that extends in a horizontal direction of the vehicle 10, and at least one vertical portion 55 that extends transverse to the horizontally extending portion 52. The plurality of mounting structures 42 couple the horizontally extending portion 52 of the accessory attachment member 38 to the reinforcement member 22. The vertical portions 55 extend in a vertical direction of the vehicle 10 when the accessory attachment member 22 is mounted to the interior floor surface 20. The accessory attachment member 38 further has second horizontally extending portions 56 that extend in a horizontal direction of the vehicle 10 from the vertical portions 55, and the vertical portions 55 space the second horizontally extending portions 56 apart from the horizontally extending portion 52 as shown.

Figure 3:
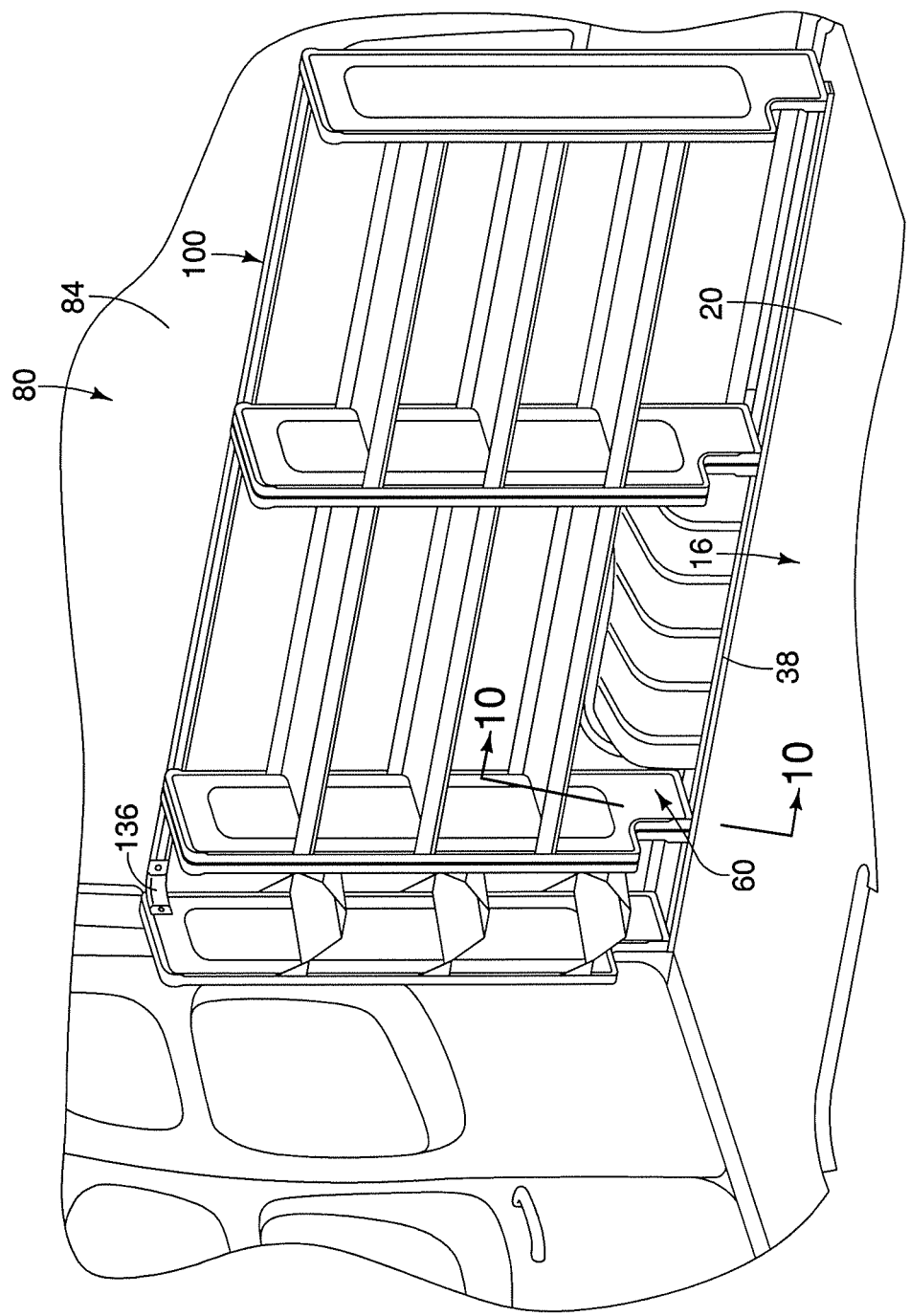
FIG. 3 is an interior perspective view of the rear driver side of the vehicle illustrated in FIG. 1.
Figure 10:
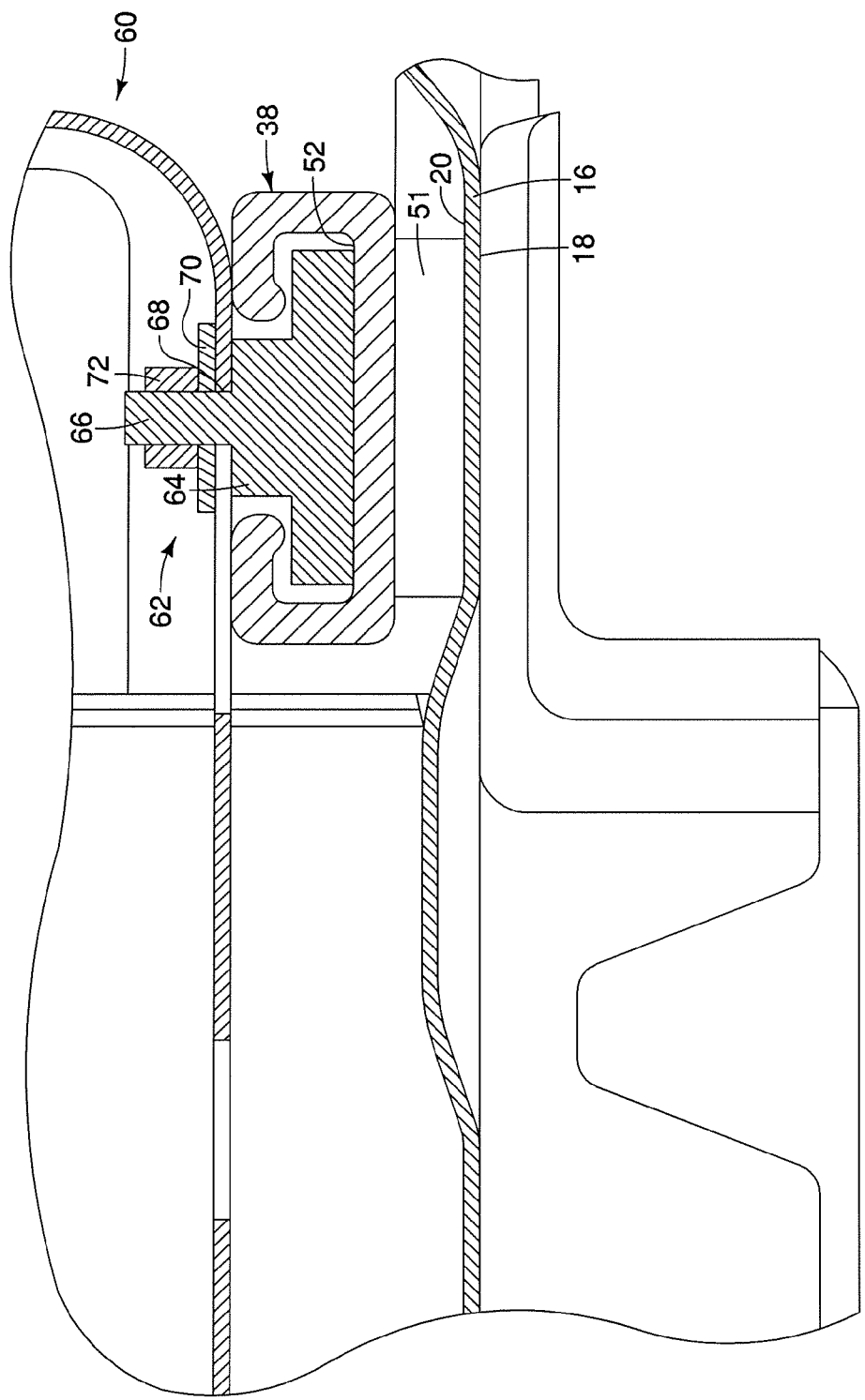
FIG. 10 is a cross-sectional view taken along lines 10-10 in FIG. 3.
Figure 11:
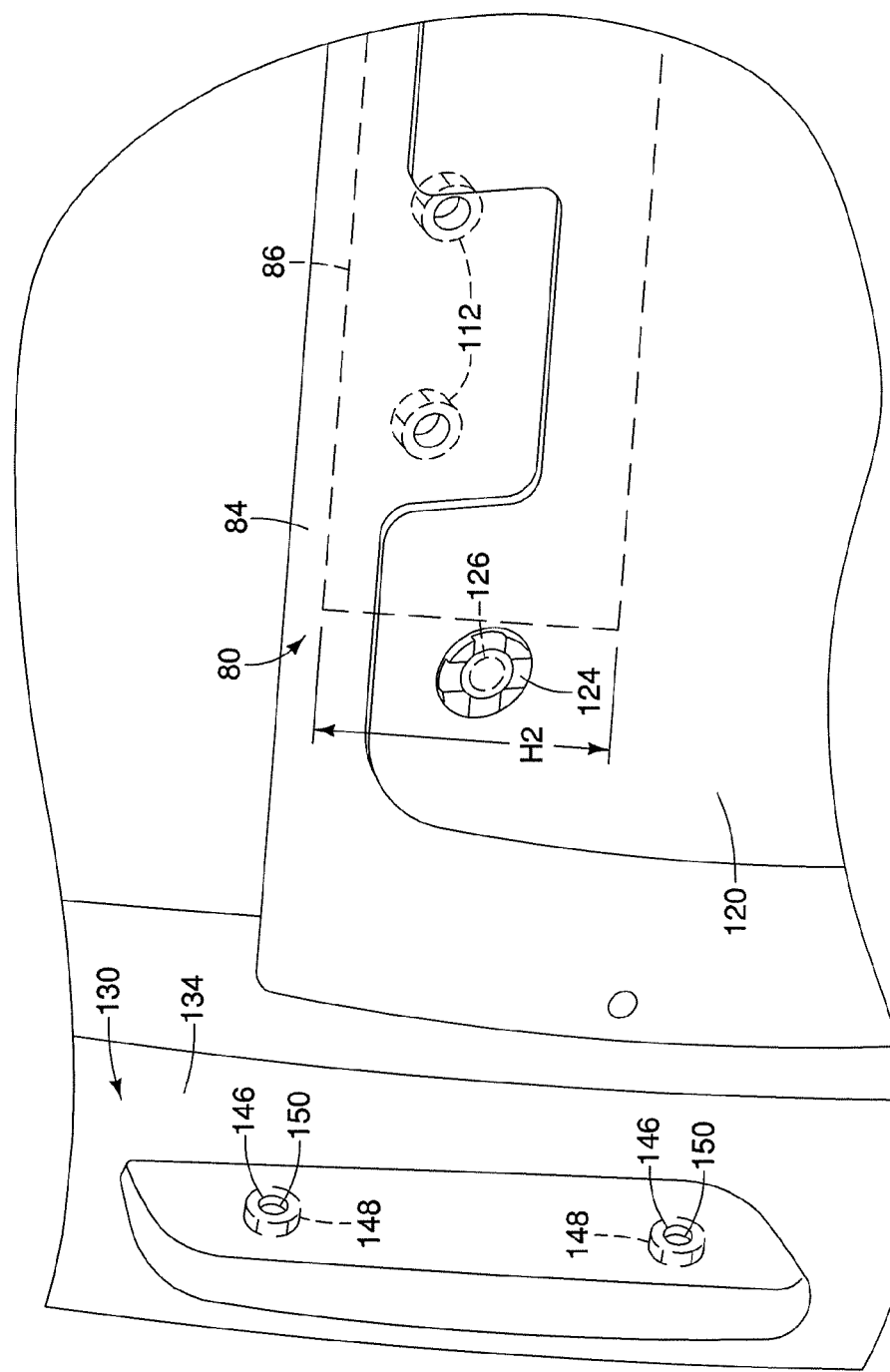
FIG. 11 is a detailed interior perspective view of the rear corner located on the rear driver side of the vehicle illustrated in FIG. 1 without accessory attachment members installed.
Figure 12:
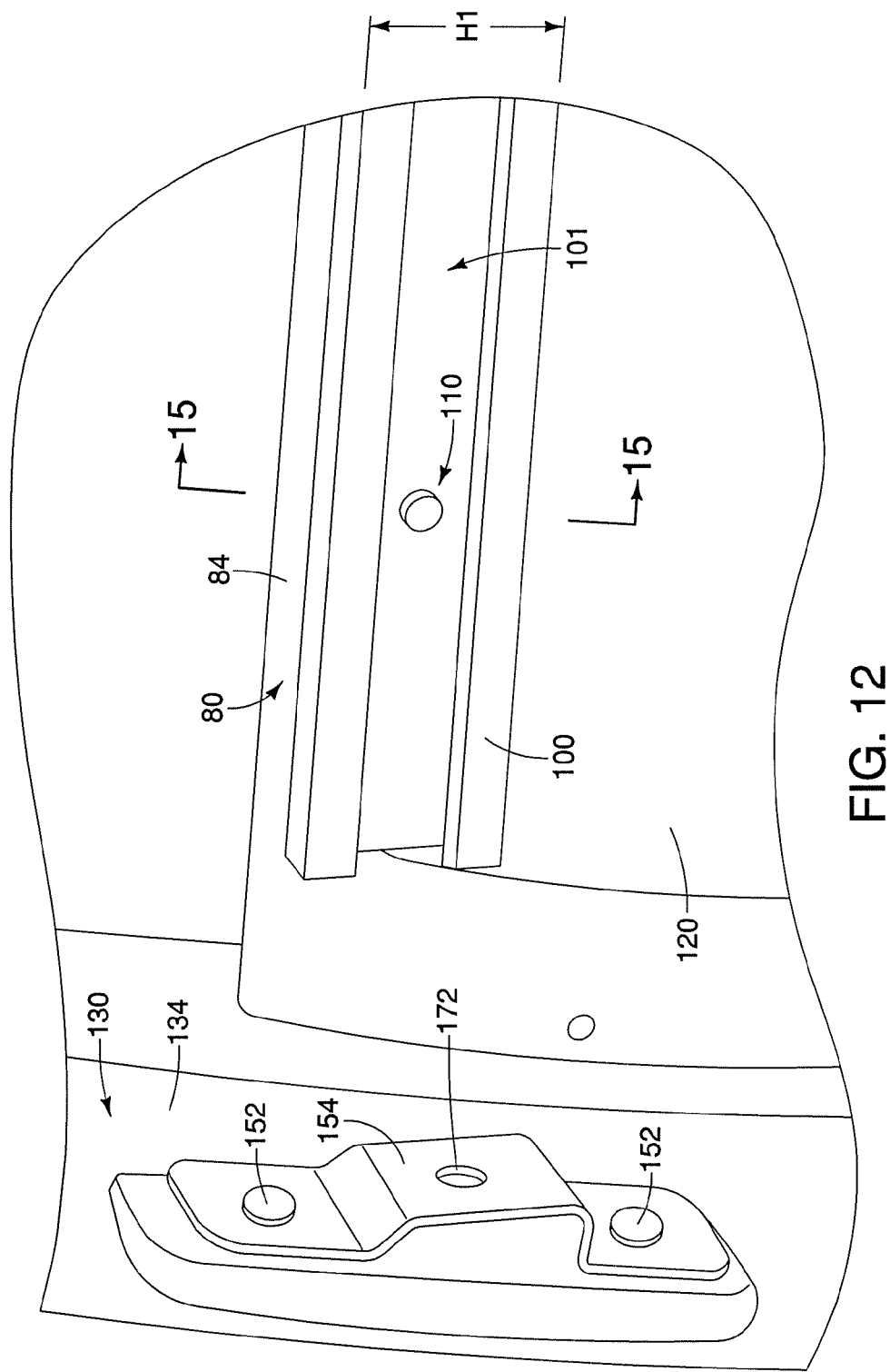
FIG. 12 is a detailed interior perspective view of the rear corner located on the rear driver side of the vehicle illustrated in FIG. 1 with certain accessory attachment members installed.
Figure 13:
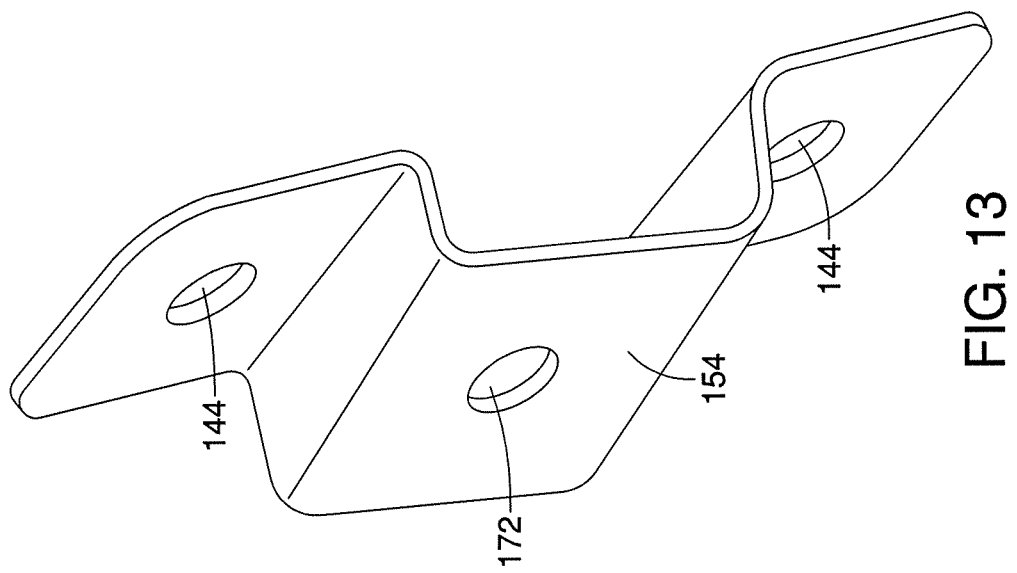
FIG. 13 is a detailed perspective view of an accessory attachment member that mounts to the rear corner located on the rear driver side of the vehicle as shown in FIG. 12.
Figure 14:
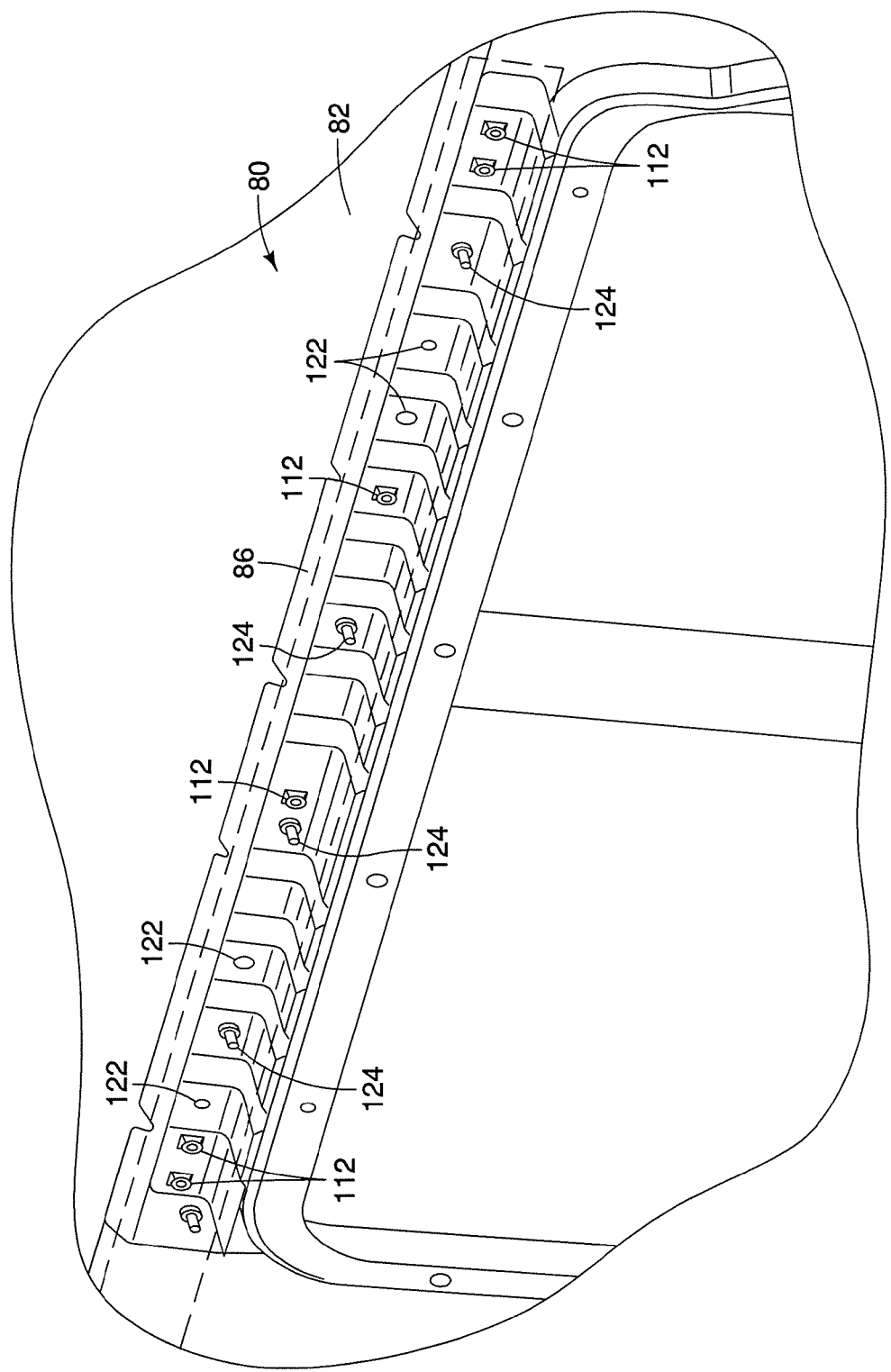
FIG. 14 is a detailed interior perspective view of the rear corner located on the rear driver side of the vehicle illustrated in FIG. 12 as viewed looking inboard toward the vehicle interior from behind the interior wall of the vehicle.
Figure 15:
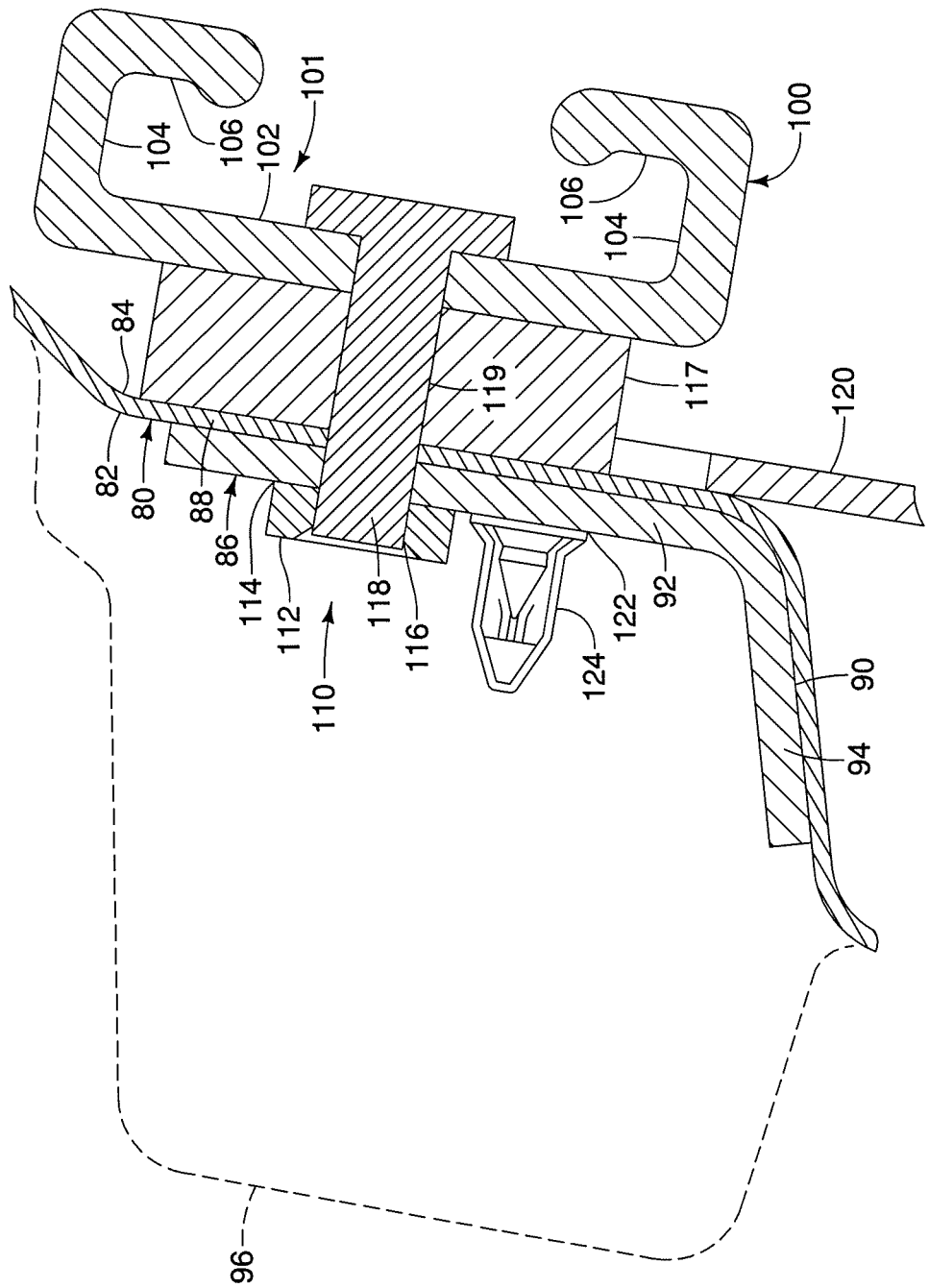
FIG. 15 is a cross-sectional view taken along lines 15-15 in FIG. 12.
Figure 16:
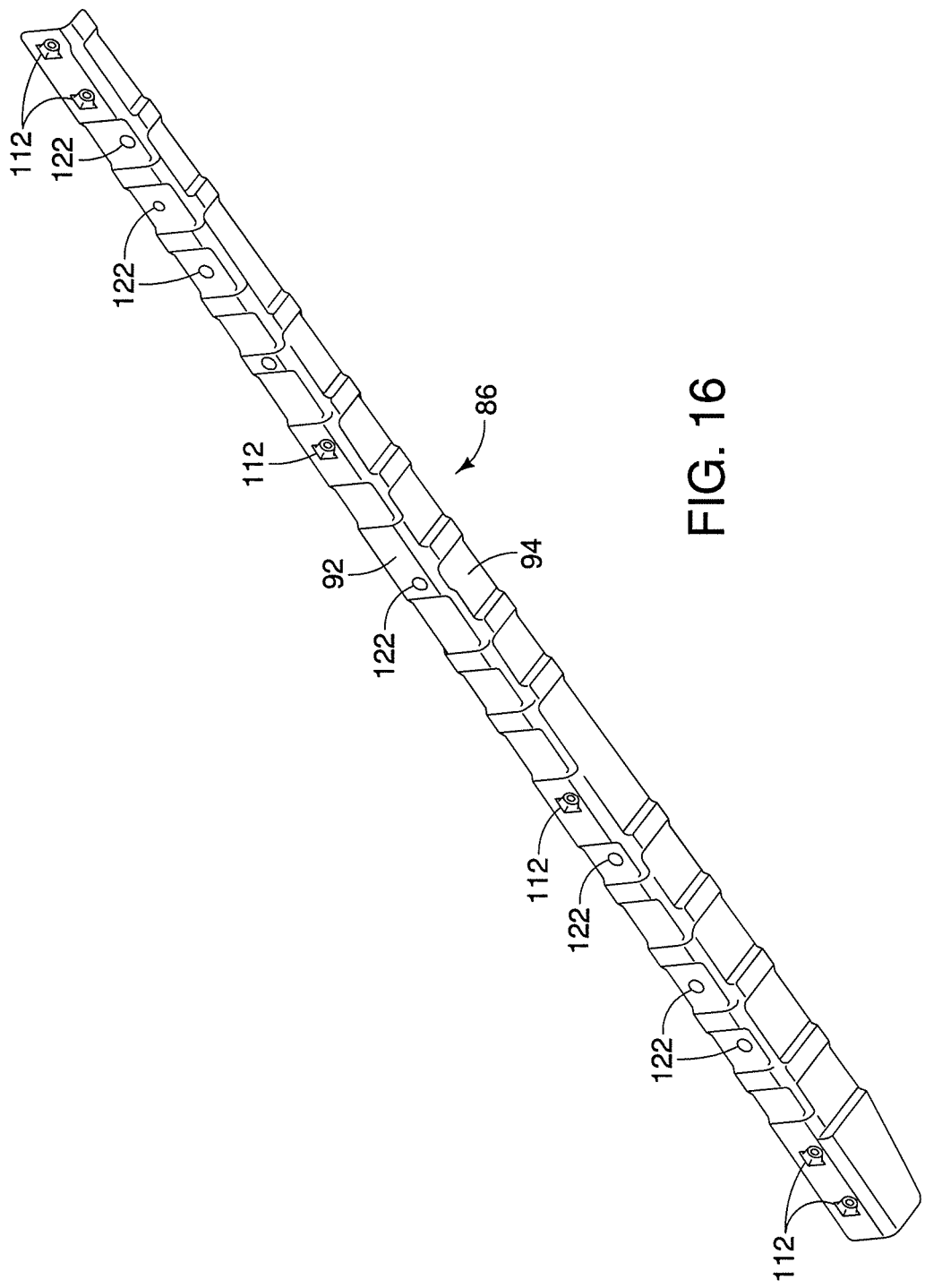
FIG. 16 is a detailed perspective view of a reinforcement member mounted at the rear driver side of the vehicle as shown in FIGS. 11, 14 and 15.
Figure 17:
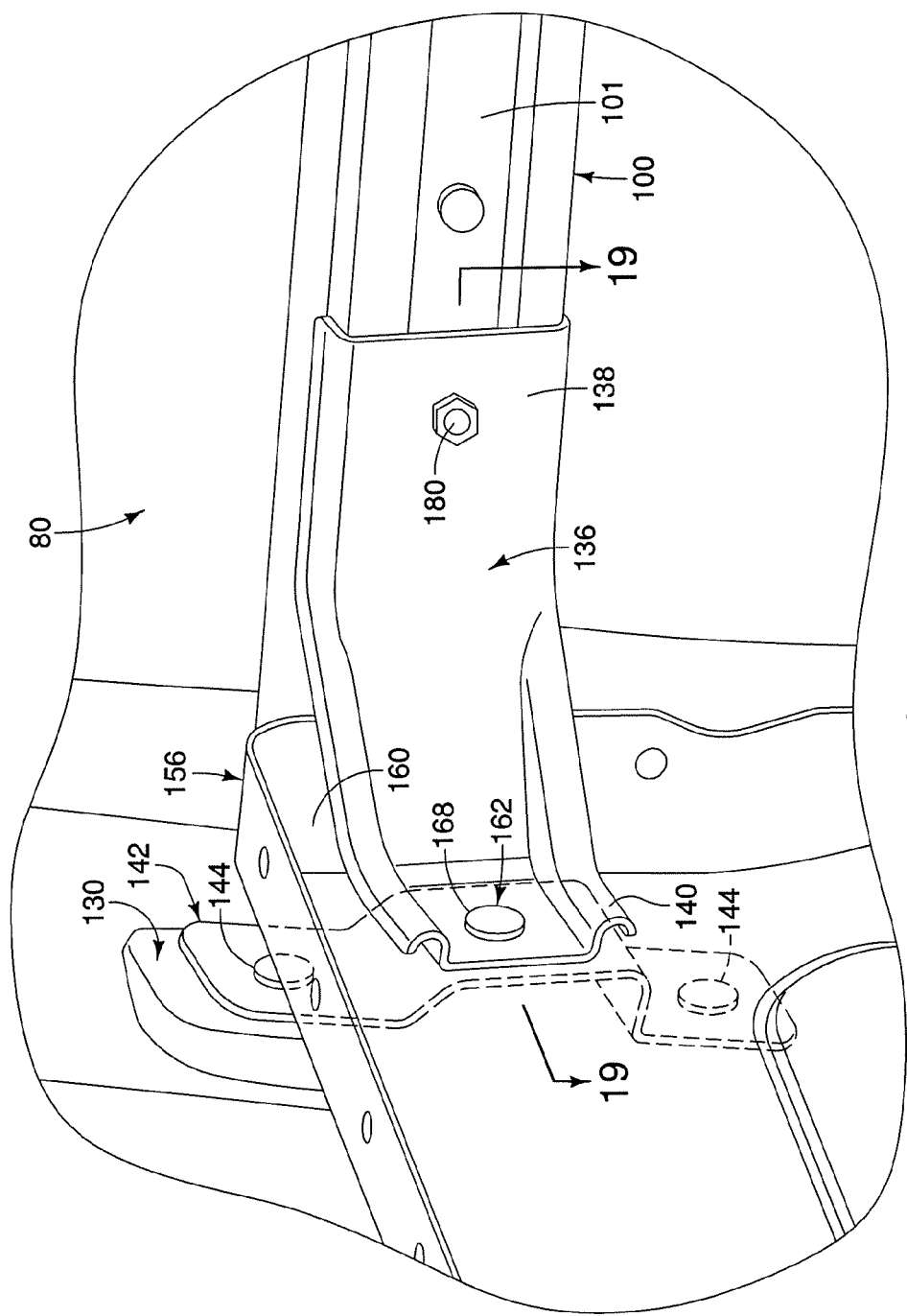
FIG. 17 is a detailed interior perspective view of the rear corner located on the rear driver side of the vehicle illustrated in FIG. 1 with accessory attachment members and shelving installed.
Figure 18:
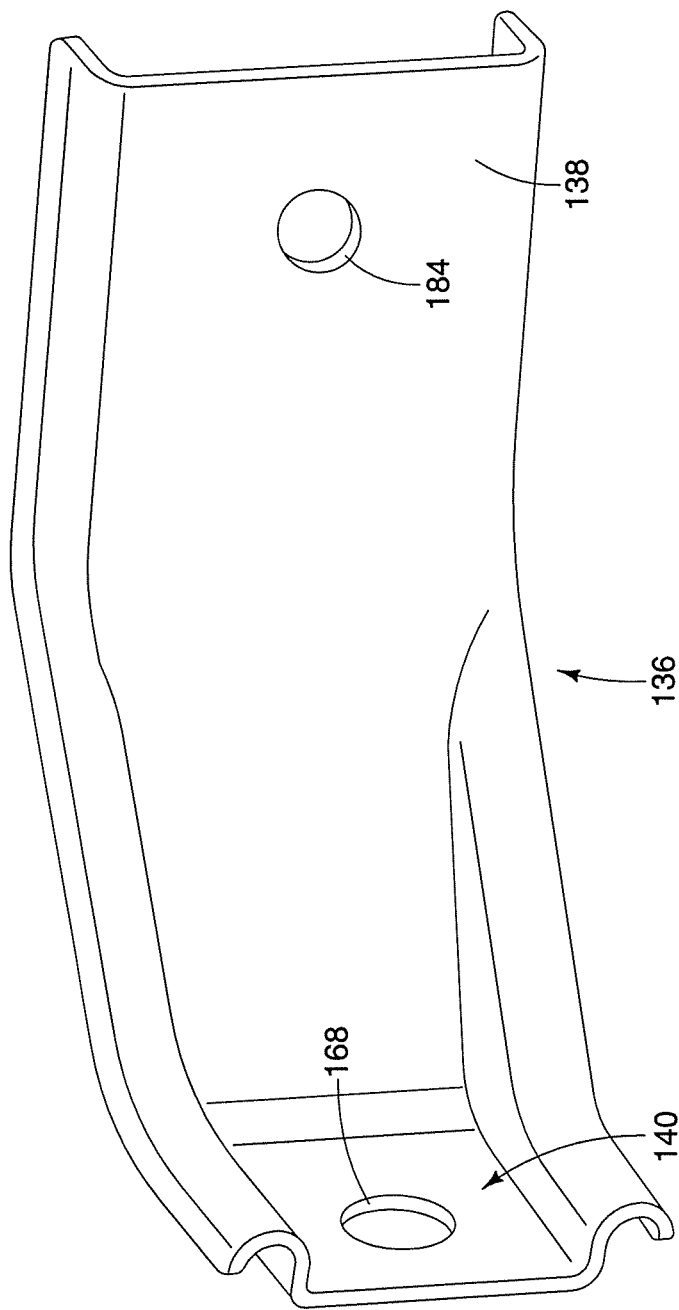
FIG. 18 is a detailed perspective view of an accessory attachment member that mounts to the interior rear corner located on the rear driver side of the vehicle as shown in FIG. 17.
Figure 19:
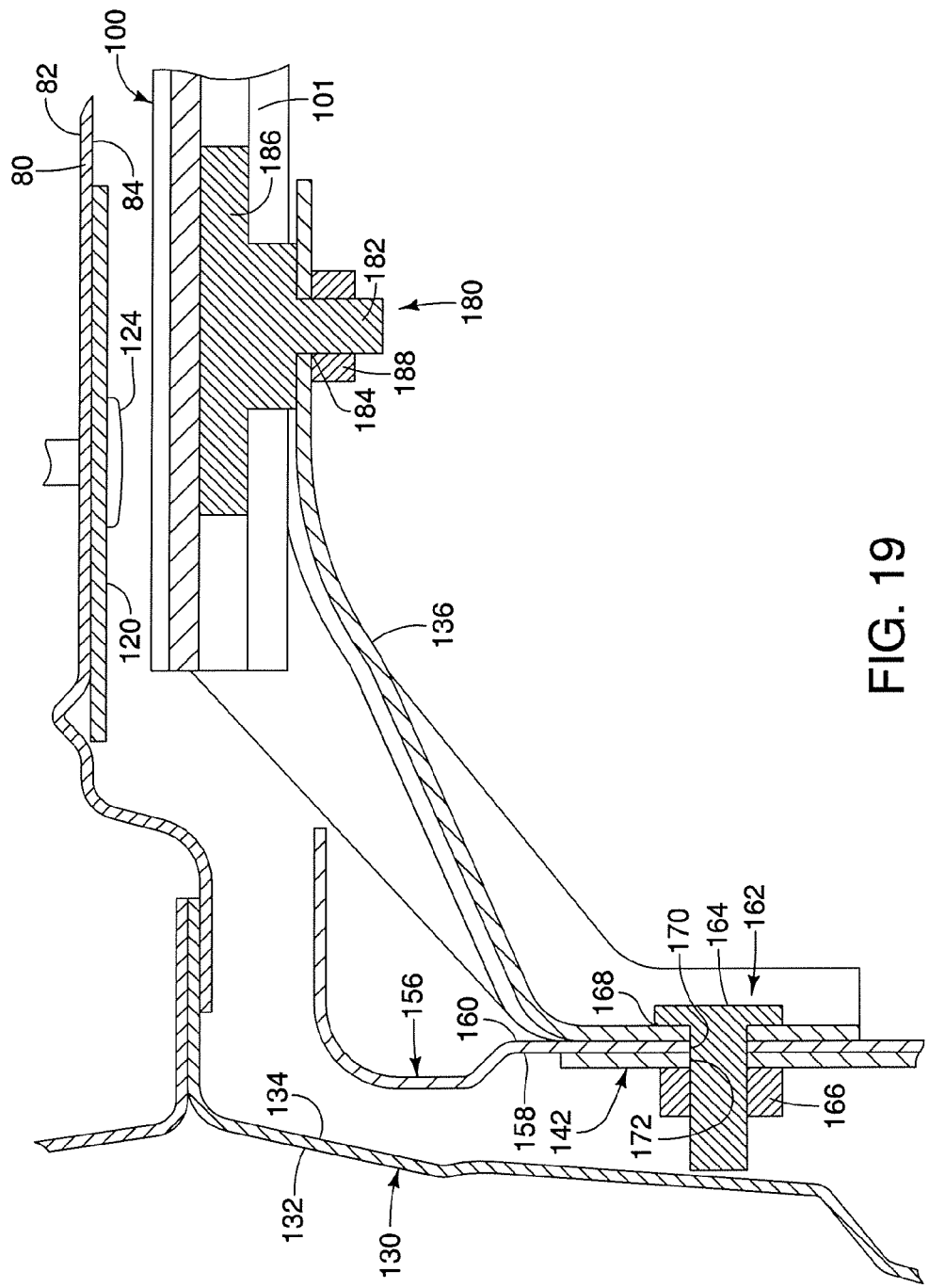
FIG. 19 is a cross-sectional view taken along lines 19-19 in FIG. 17.

As further illustrated in FIGS. 3 and 10, for example, the accessory attachment member 38 is further configured to couple to a shelving member 60 to secure the shelving member 60 inside the vehicle 10. The shelving member 60 can be made of metal or any other suitable material. As shown in FIG. 10, a connecting member 62 includes a coupling member 64 that rests on the horizontally extending portion 52 of the accessory attachment member 38, is slidably received in the recess channel 43 formed by the C-shaped cross section of the accessory attachment member 38, and is retained by the second horizontally extending portions 56. An extension portion 66 of the coupling member 64 passes through an opening 68 in the shelving member 60. A washer 70, and nut 72 that is threadedly secured to the extension portion 66, secures the shelving member 60 to the accessory attachment member 38 in this example. However, any suitable type of connector, such as a screw, snap fit connection, and so on can be used to secure the shelving member 60 to the accessory attachment member 38.

As shown in FIGS. 2, 3, 5, 8, 11, 12, 14, 15, 17 and 19, the portion of the reinforced vehicle structure 12 at the rear driver side of the vehicle 10 includes a vehicle wall 80 having an outer wall surface 82 facing an outboard direction of the vehicle 10 and an inner wall surface 84 facing an inboard direction of the vehicle 10. The vehicle wall 80 is made of a metal typically used in automotive manufacture or any other suitable material. A reinforcement member 86 is mounted to the outer wall surface 82 by welding, riveting, screws, or any other suitable fasteners. The reinforcement member 86 is also made of a metal that can be the same as the metal of vehicle wall 80, or any other suitable metal or material.

A portion of the outer wall surface 82 of the vehicle wall 80 has a first shape and the reinforcement member 86 has a second shape substantially corresponding to the first shape to enable the reinforcement member 86 to mate with the portion of the outer wall surface 82 when the reinforcement member 86 is mounted to the outer wall surface 82. In this example, the vehicle wall 80 includes a wall upright portion 88 that includes the inner and outer wall surfaces 84 and 82, respectively, and a wall lateral portion 90 extending outboard from the upright portion 88. Furthermore, the reinforcement member 86 includes a reinforcement upright portion 92 and a reinforcement lateral portion 94 extending outboard from the reinforcement upright portion 92. The reinforcement upright portion 92 and reinforcement lateral portion 94 are positioned proximate to the wall upright portion 88 and wall lateral portion 90, respectively, when the reinforcement member 86 is mounted to the outer wall surface 82 of the vehicle wall 80. Also, the reinforcement member 86 can be mounted proximate to a roof rail 96 of the vehicle 10 when the reinforcement member 86 is mounted to the outer wall surface 82.

An accessory attachment member 100 is mounted inside the cargo compartment 14 to the inner wall surface 84 at an upper portion of the vehicle wall 80 in this example. The accessory attachment member 100 is made of a metal, such as that of vehicle wall 80 or reinforcement member 86, or any other suitable metal or material. In this example, the accessory attachment member 100 has a height H1 extending in a vertical direction of the vehicle 10, and the reinforcement member 86 has a height H2 extending in the vertical direction that is greater than the height H1.

Furthermore, the accessory attachment member 100 in this example has a C-shaped cross-section forming a recess channel 101 therein. That is, the accessory attachment member 100 has a vertically extending portion 102 that extends in a generally vertical direction of the vehicle 10, and at least one horizontal portion 104 that extends transverse to the vertically extending portion 102. Specifically, the horizontal portions 104 extend in a generally inboard direction of the vehicle 10 when the accessory attachment member 100 is mounted to the inner wall surface 84. The accessory attachment member 100 further has second vertically extending portions 106 that extend in a generally vertical direction of the vehicle 10 from the horizontal portions 104. Accordingly, the horizontal portions 104 space the second vertically extending portions 106 apart from the vertically extending portion 102.

A plurality of mounting structures 110 are spaced along the reinforcement member 86 and extend through the vehicle wall 80 to couple the accessory attachment member 100 to the reinforcement member 86. At least one of the mounting structures 110 includes a welded member 112 that is attached by a weld to a surface 114 of the reinforcement member 86 facing away from the vehicle wall 80. The welded member 112 is aligned with a fastening aperture 116 formed in the reinforcement member 86 through which a portion 118 of the mounting structure 110 passes. In this example, the portion 118 of the mounting structure 110 can include a bolt that is threadedly secured to the welded member 112 to secure the accessory attachment member 100 to the reinforcement member 86. However, the portion 118 of the mounting structure 110 can include a rivet, screw or any other suitable type of fastener. In this example, the plurality of mounting structures 110 couple the vertically extending portion 102 of the accessory attachment member 100 to the reinforcement member 86.

Furthermore, a spacer 117 can be present between the accessory attachment member 100 and inner wall surface 84 as indicated to offset the accessory attachment member 100 a desired distance from the inner wall surface 84. The portion 118 of the mounting structure 110 passes through an opening 119 in the spacer 117. The spacer 117 can be arranged as individual spacers present at each of the mounting structure locations, or a continuous spacer that extends along all or a portion of the accessory attachment member 100 and has openings through which the respective portions 118 of the mounting structure 110 can pass.

As further illustrated, a trim member 120, such as an interior trim panel of a type that is typically present in vehicles, is disposed proximate to the inner wall surface 84. In this example, the accessory attachment member 100 is mounted to the inner wall surface 84 such that the trim member 120 that is disposed proximate to the inner wall surface 84 is positioned between the accessory attachment member 100 and the vehicle wall 80. Furthermore, the reinforcement member 86 includes at least one fastening aperture 122 that receives a portion of a mounting member 124 of the trim member 120 that passes through an opening 126 in the vehicle wall 80. However, the trim member 120 can be secured proximate to the vehicle wall 80 in any suitable manner.

As further illustrated in FIGS. 3 and 10, for example, the accessory attachment member 100 is further configured to couple to the shelving member 60 to further secure the shelving member 60 inside the vehicle 10. A connecting member (not shown) similar to connecting member 62 as discussed above can be slidably received in the recess channel 101 formed by the C-shaped cross section of the accessory attachment member 100, and is coupled to the shelving member 60 in a manner similar to connecting member 62 to secure the shelving member 60 to the accessory attachment member 100 in this example. However, any suitable type of connector, such as a screw, snap fit connection, and so on can be used to secure the shelving member 60 to the accessory attachment member 100.

As further shown, for example, in FIGS. 2, 3, 11, 12 and 17-19, the reinforced vehicle structure 12 can further include a second vehicle wall 130 extending transverse to the vehicle wall 80, which can be referred to as a first vehicle wall 80. The second vehicle wall 130 includes a second outer wall surface 132 facing an exterior of the vehicle 10 and a second inner wall surface 134 facing an interior of the vehicle 10. The reinforced vehicle structure 12 also includes a reinforcement member 136 having a first end 138 mounted to the accessory attachment member 100 and a second end 140 mounted to the second inner wall surface 134. The mounted reinforcement member 136 therefore extends in a direction that is not parallel to either of the first and second vehicle walls 80 and 130.

Furthermore, in this example, a mounting member 142 is mounted to the second inner wall surface 134. For instance, the mounting member 142 includes a plurality of openings 144 that align with openings 146 in the second vehicle wall 130. A reinforcement member 148, such as a welded member, can be attached to the second outer surface 132 by welding or in any other suitable manner. The reinforcement member 148 can include an opening 150 therein that is aligned with an opening 146 in the second vehicle wall 130. Accordingly, a mounting structure 152, such as a bolt, can pass through respective openings 144 and 146 and threadedly engage with the opening 150 in the reinforcement member 148 to secure the mounting member 142 to the second vehicle wall 130. In this example, a plurality of mounting structures 152 are spaced along the mounting member 142 and extend through the corresponding openings 144 in the mounting member 142, through the corresponding openings 146 in second vehicle wall 130, and into the corresponding openings 150 in the reinforcement members 148, to couple the mounting member 142 to the second vehicle wall 130.

The mounting member 142 in this example further includes a raised portion 154 that extends away from the second inner wall surface 134. The plurality of mounting structures 152 are spaced along portions of the mounting member 142 other than the raised portion 154, and extend through the second vehicle wall 130 to couple the mounting member 142 to the second vehicle wall 130.

A vehicle accessory 156 having a first accessory surface 158 and a second accessory surface 160 on a side opposite to the first accessory surface 158 is positioned between the mounting member 142 and the reinforcement member 136. The vehicle accessory 156 can be, for example, a side panel of shelving member 60, or a different vehicle accessory component. In this example, the first accessory surface 158 contacts the mounting member 142 and, in particular, the raised portion 154 of the mounting member 142. The second accessory surface 160 contacts the reinforcement member 136.

As further shown in this example, the second end 140 of the reinforcement member 136 is connected to the mounting member 142 by a coupling structure 162 which, in this example, includes a bolt 164 and nut 166. However, the coupling structure 162 can include any suitable type of coupling arrangement. The coupling structure 162 is positioned between a plurality of the mounting structures 152 and extends through an opening 168 in the second end 140 of the reinforcement member 136, an opening 170 in the vehicle accessory 156, and an opening 172 in the raised portion 154 of the mounting member 142, to couple the second end 140 of the reinforcement member 136 to the mounting member 142. Accordingly, the second end 140 of the reinforcement member 136 is connected to the raised portion 154 of the mounting member 142. Thus, the mounting member 142 mounts the second end 140 of the reinforcement member 136 to the second inner wall surface 134.

With regard to the first end 138 of the reinforcement member 136, as illustrated, a coupling member 180 couples the first end 138 of the reinforcement member 136 to the accessory attachment member 100. As discussed above, the accessory attachment member 100 has a C-shaped cross-section defining a recess 101, and the coupling member 180 has a first coupling end 182 that passes through an opening 184 in the first end 138 of the reinforcement member 136 and a second coupling end 186 that couples to the accessory attachment member 100. That is, the first coupling end 182 can threadedly engage with a nut 188 to secure the coupling member 180 to the first end 138 of the reinforcement member 136. The second coupling end 186 is received in the recess 101 of the accessory attachment member 100 to couple the first end 138 of the reinforcement member 136 to the accessory attachment member 100.

As further shown in FIGS. 2, 4, 5 and 20-22, a portion of the reinforced vehicle structure 12 located at the rear interior passenger side of the vehicle 10 includes features similar to those discussed above with regard to the rear interior driver side of the vehicle 10. For example, the portion of the reinforced vehicle structure 12 located at the rear interior passenger side of the vehicle 10 includes the vehicle floor 16 having the underbody floor surface 18 facing an underbody of the vehicle 10 and the interior floor surface 20 facing an interior of the vehicle 10. A reinforcement member 200 is mounted to the underbody floor surface 18 by welding, riveting, screws, or any other suitable fasteners. The reinforcement member 200 is also made of a metal that can be the same as the metal of vehicle floor 16, or any other suitable metal or material.

In this example, the reinforcement member 200 is mounted proximate to a wheel well opening 202 in the vehicle floor 16. As shown, for example, in FIGS. 5 and 20-22, the vehicle floor 16 has a first shaped edge 204 having a first shape defining the wheel well opening 202. Similarly, the reinforcement member 200 has a second shaped edge 206 having a second shape, with a portion of the second shape substantially corresponding to the first shape. Moreover, a portion of the underbody floor surface 18 of the vehicle floor 16 has a first shape and the reinforcement member 22 has a second shape substantially corresponding to the first shape to enable the reinforcement member 200 to mate with the portion of the underbody floor surface 18 when the reinforcement member 200 is mounted to the underbody floor surface 18.

Figure 22:
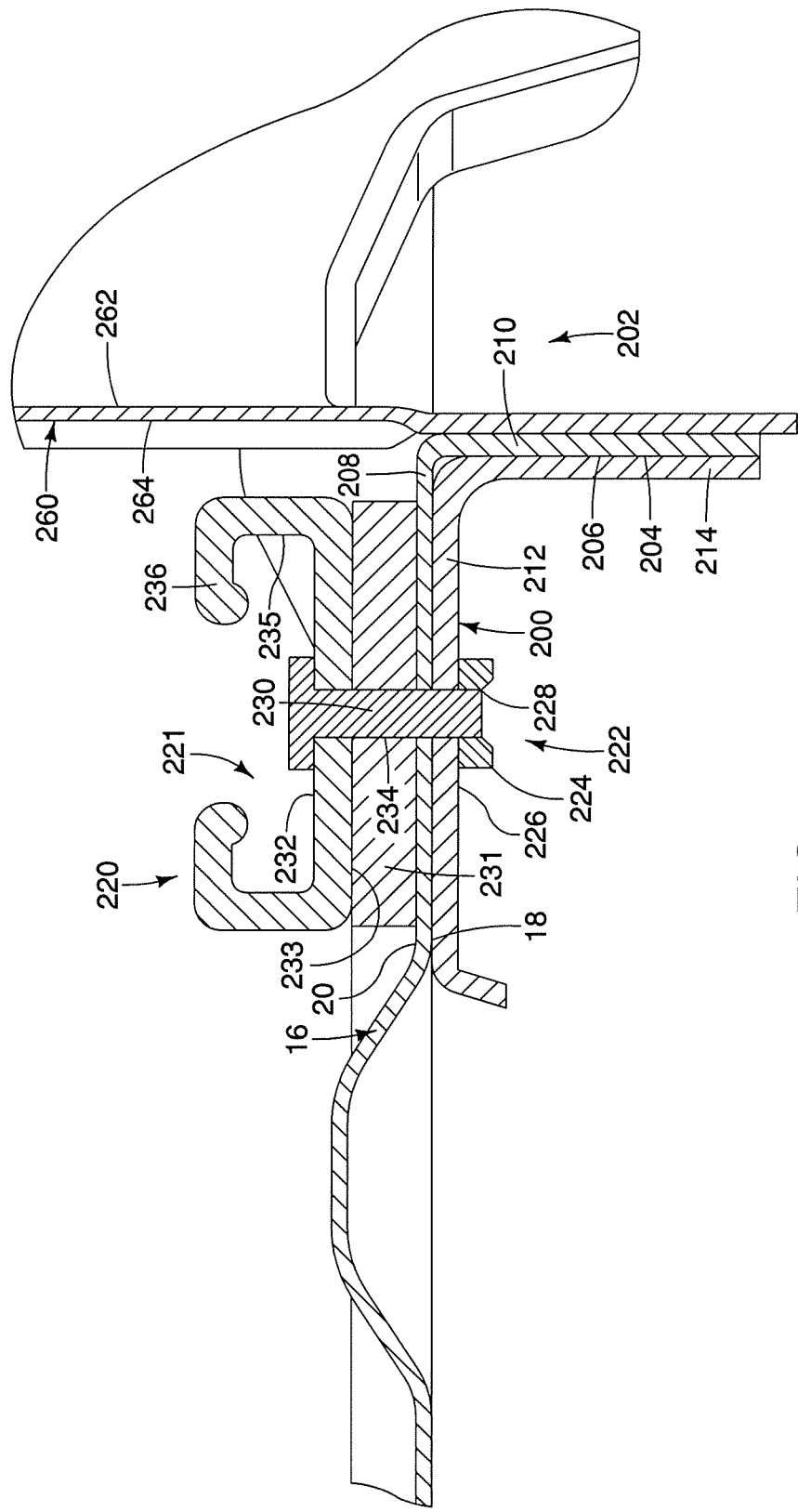
FIG. 22 is a cross-sectional view taken along lines 22-22 in FIG. 21.
Figure 23:
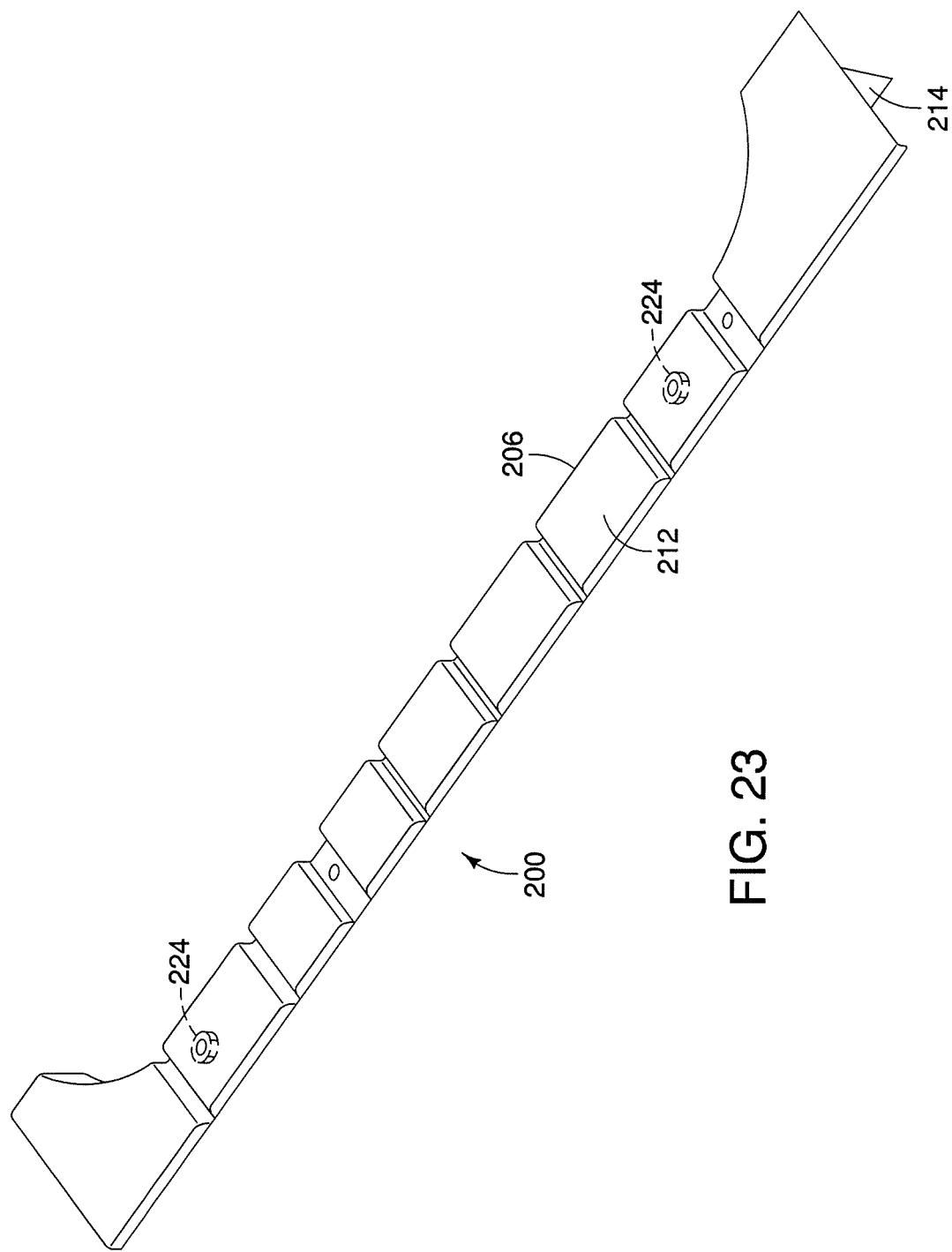
FIG. 23 is a perspective view of a reinforcement member mounted at the rear passenger side of the vehicle as shown in FIGS. 20-22.

That is, as shown in FIG. 22, in particular, the vehicle floor 16 includes a lateral floor portion 208 that includes the interior and underbody floor surfaces 20 and 18, and a floor flange 210 extending downward from the lateral floor portion 30. The reinforcement member includes a lateral reinforcement portion 212 and a reinforcement flange 214 extending downward from the lateral reinforcement portion 212. Accordingly, the lateral reinforcement portion 212 and reinforcement flange 214 are positioned proximate to the lateral floor portion 208 and floor flange 210, respectively, when the reinforcement member 200 is mounted to the underbody floor surface 18 of the vehicle floor 16. However, the reinforcement member 200 can be mounted at any other suitable location along the vehicle floor 16.

An accessory attachment member 220 is mounted to the interior floor surface 20 inside the cargo compartment 14 of the vehicle 10. The accessory attachment member 220 is made of a metal, such as that of vehicle floor 16 or reinforcement member 200, or any other suitable metal or material. In this example, the accessory attachment member 220 has a width W3 extending in a lateral direction of the vehicle 10, and the reinforcement member 200 has a width W4 extending in the lateral direction that is greater than the width W3 as shown, for example, in FIG. 5. Furthermore, the reinforcement member 200 has a length L3 extending in a lengthwise direction of the vehicle 10, and the accessory attachment member 220 has a length L4 extending in the lengthwise direction that is greater than the length L3.

Figure 5:
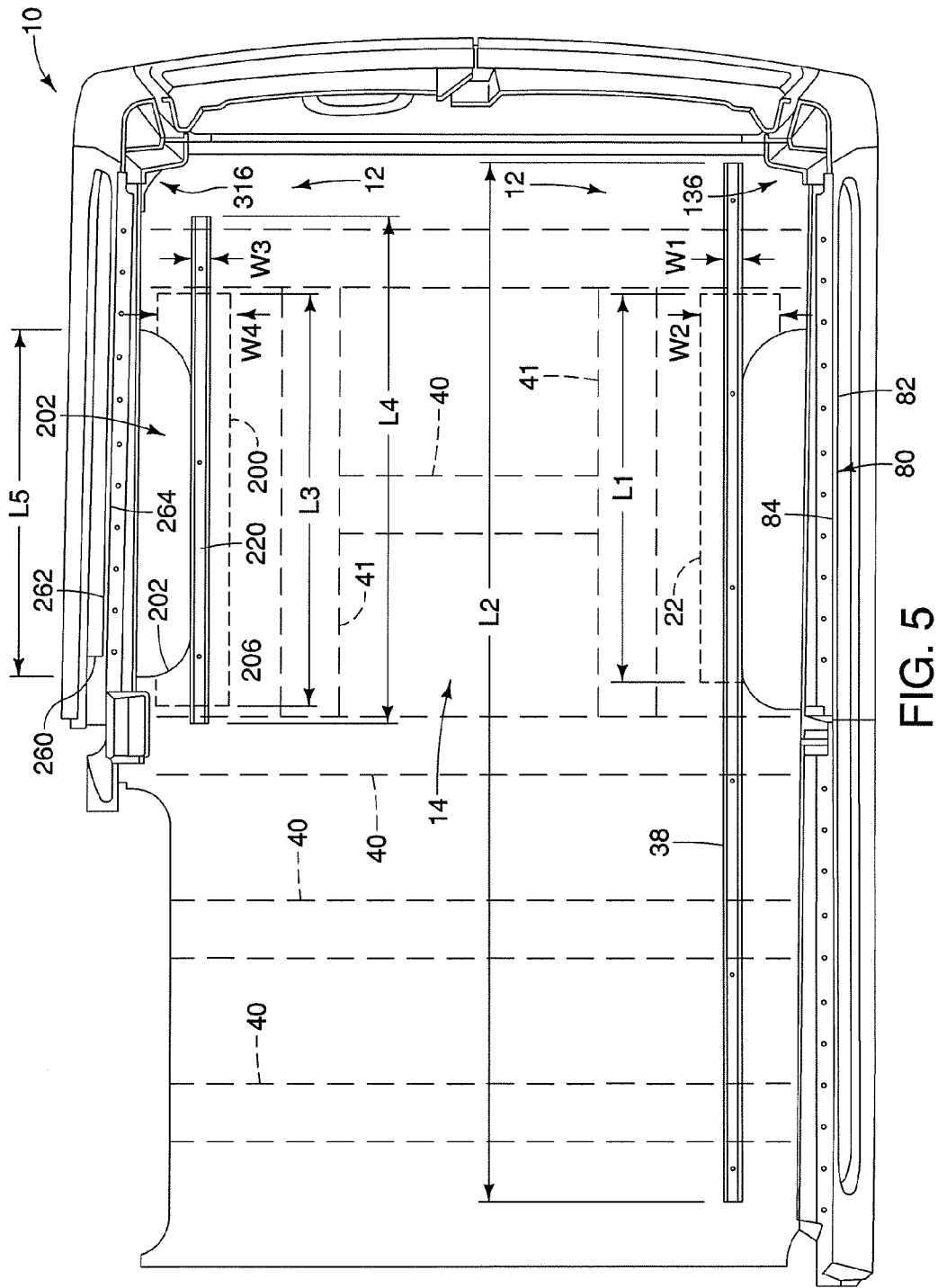
FIG. 5 is a plan view as shown in FIG. 2 particularly illustrating accessory attachment members mounted in the vehicle.
Figure 6:
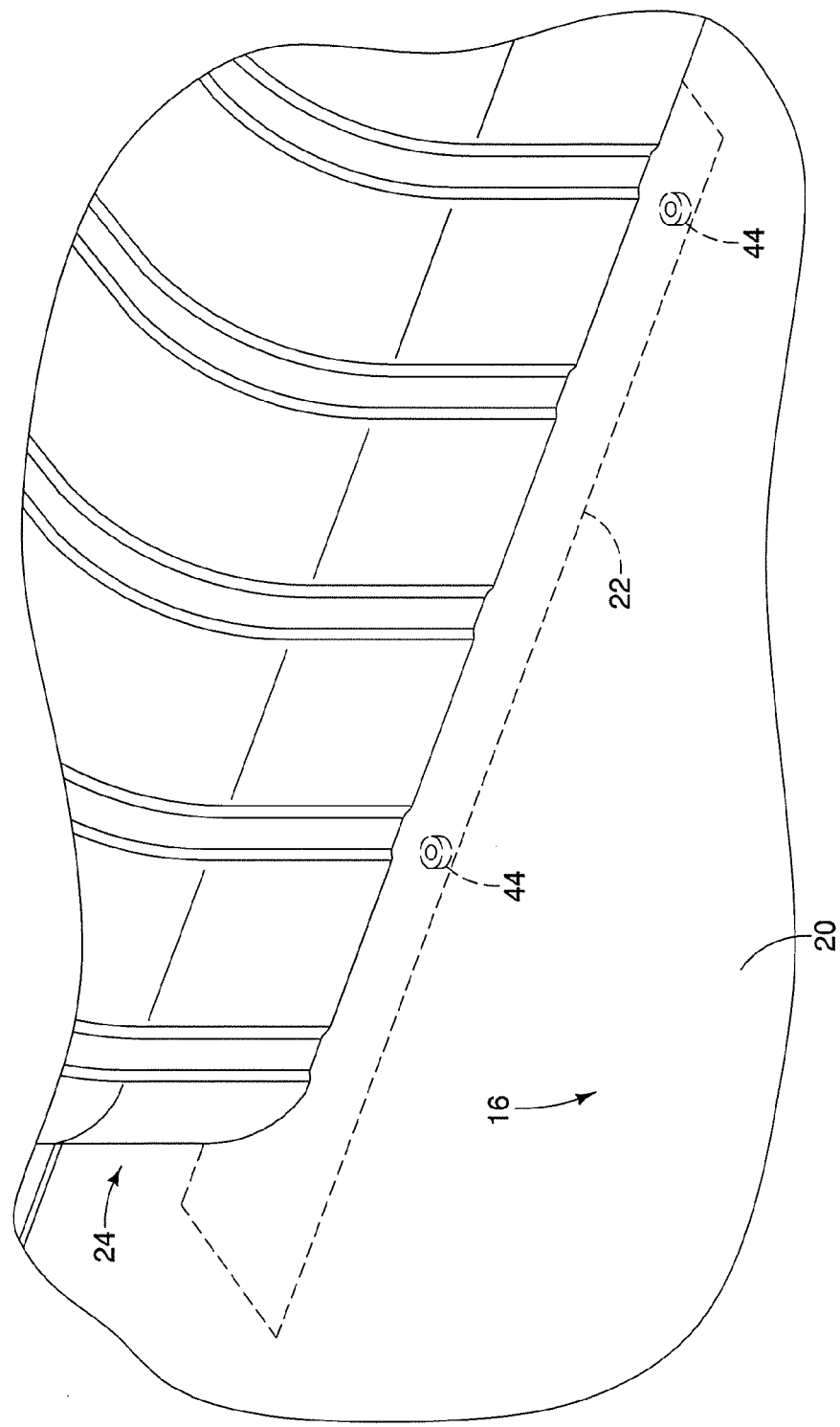
FIG. 6 is a detailed interior perspective view of the wheel area located on the rear driver side of the vehicle illustrated in FIG. 1.
Figure 7:
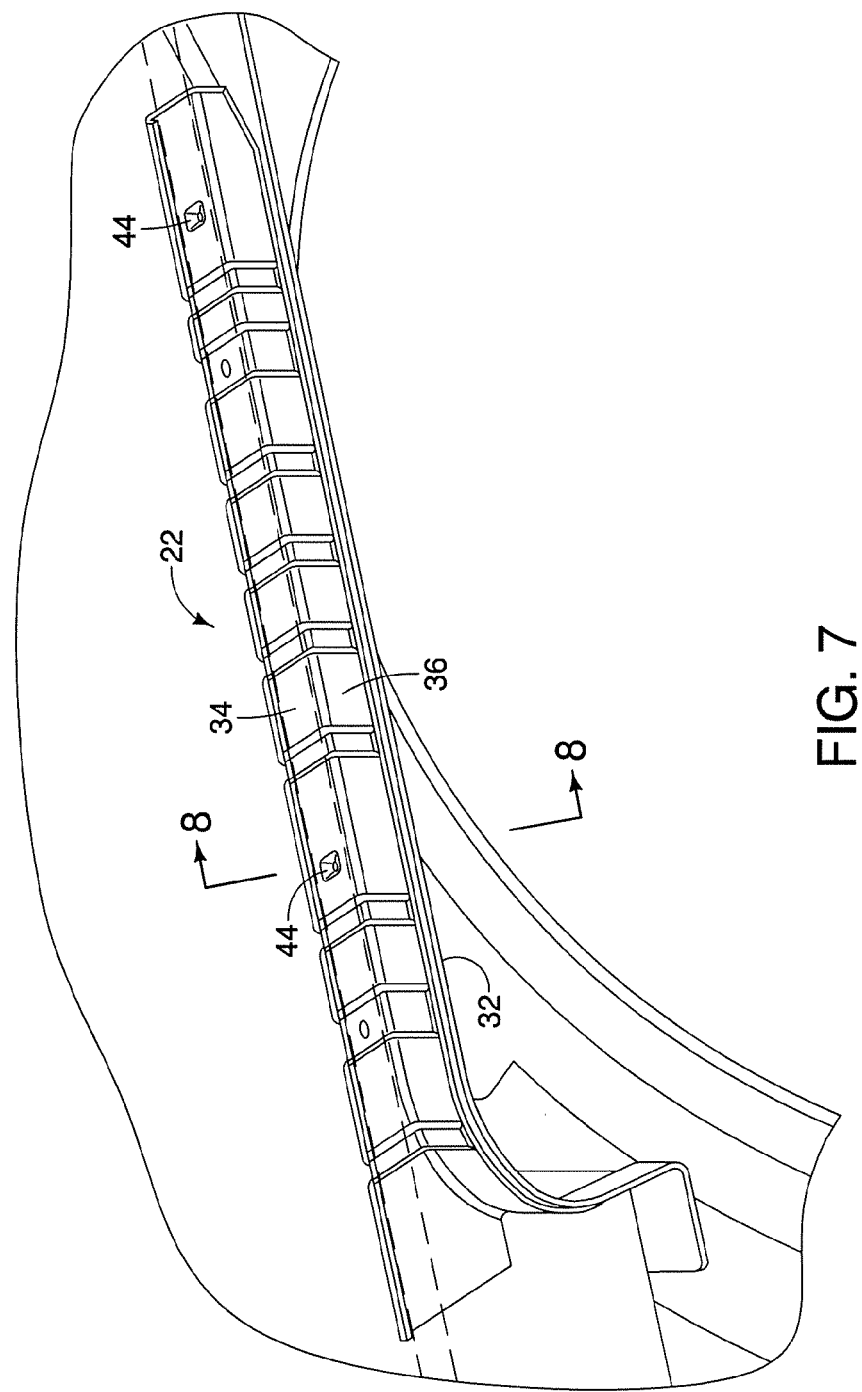
FIG. 7 is a detailed underbody perspective view of the wheel area located on the rear driver side of the vehicle as shown in FIG. 6 looking upward from below the floor of the vehicle.
Figure 20:
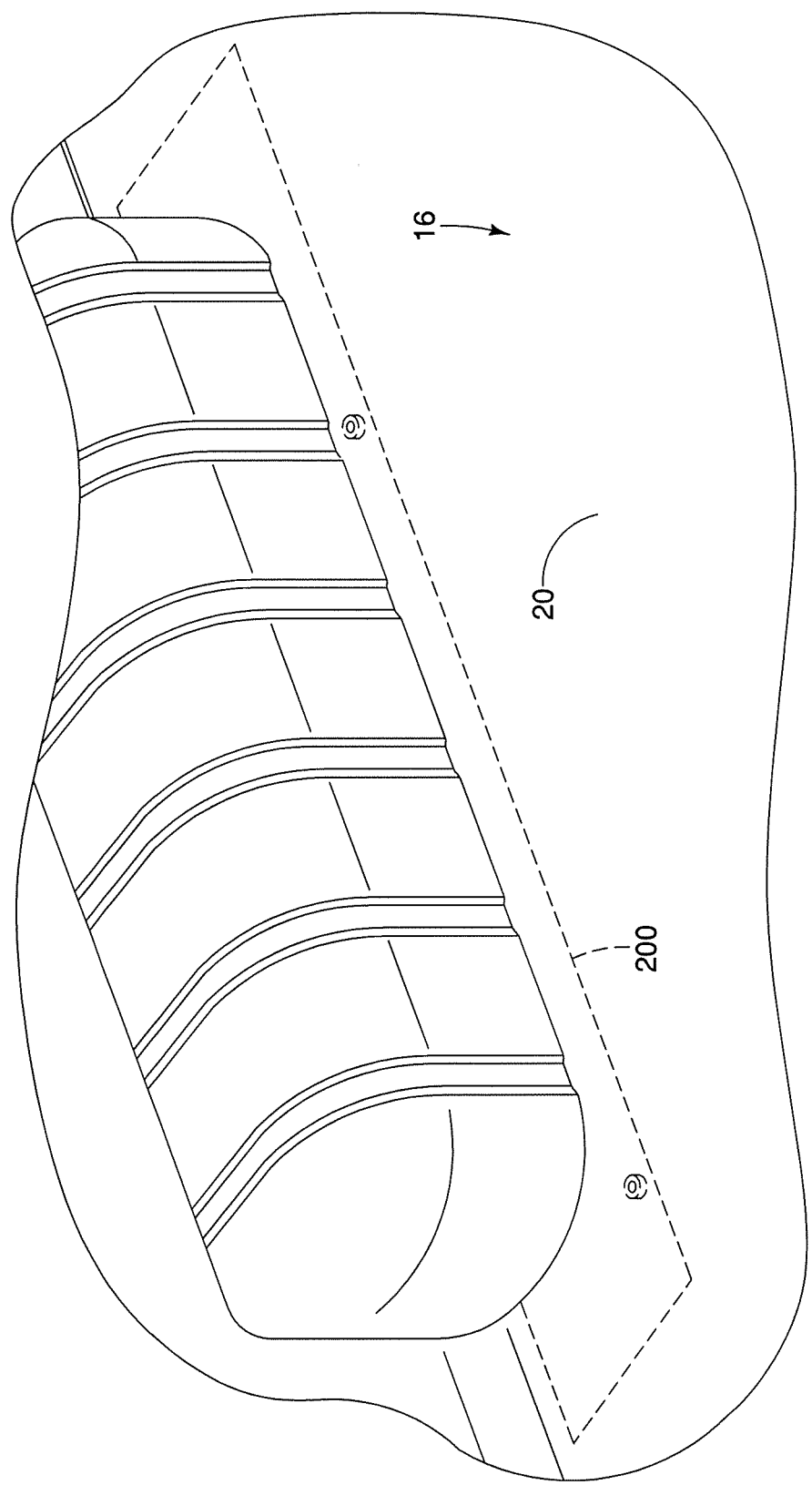
FIG. 20 is a detailed interior perspective view of the wheel area located on the rear passenger side of the vehicle illustrated in FIG. 1.
Figure 21:
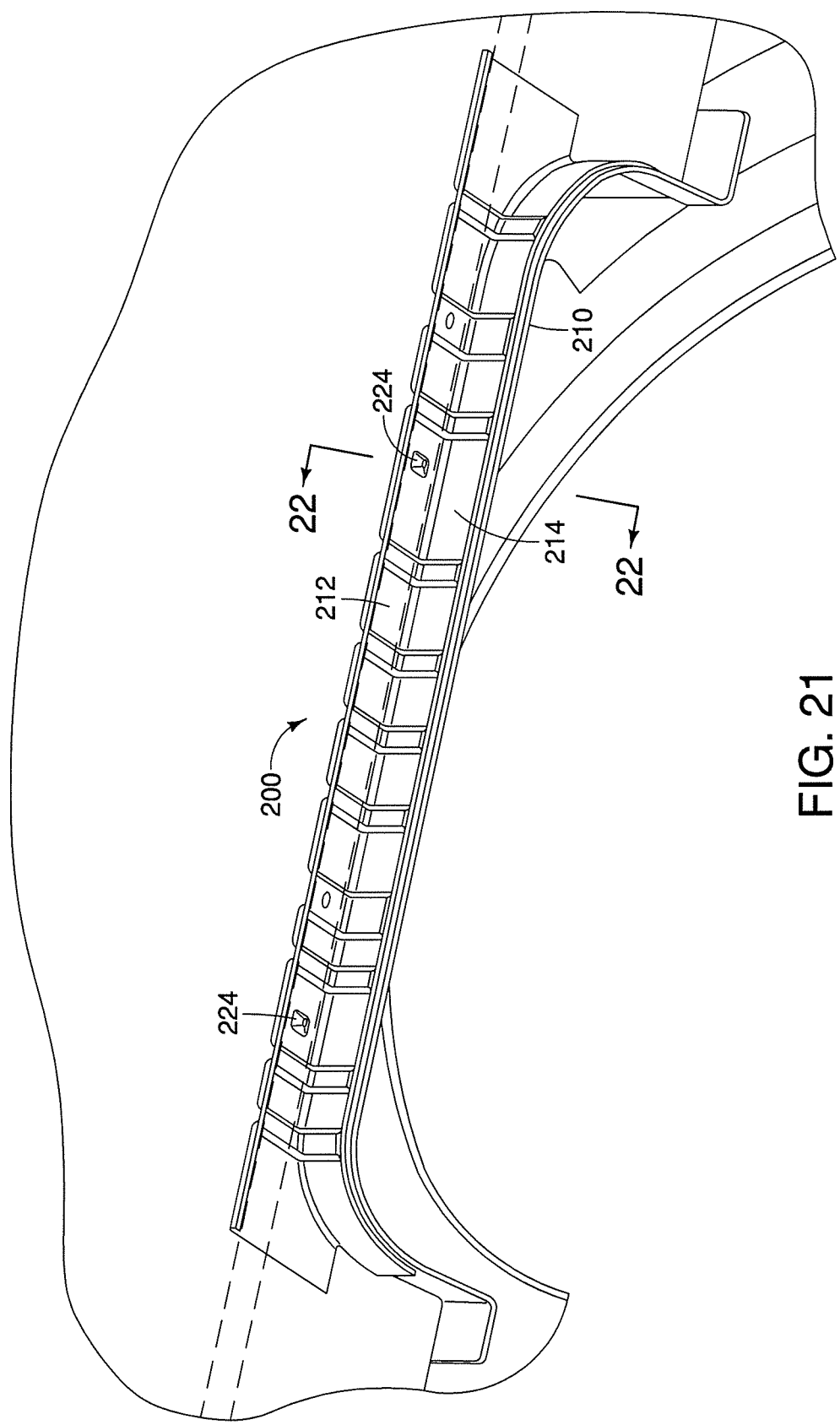
FIG. 21 is a detailed underbody perspective view of the wheel area located on the rear passenger side of the vehicle as shown in FIG. 20 looking upward from below the floor of the vehicle.

As discussed above, the vehicle floor 16 further includes at least one support member 40 having a length extending in a lateral direction of the vehicle 12. However, in this example, the accessory attachment member 220 at the rear passenger side of the vehicle 10 does not extend over the support member 40 and is thus not structurally supported by the support members 40 or 41. Accordingly, the length L3 of the reinforcement member 200 is longer than the length L5 of the wheel well opening 202 extending in a longitudinal direction of the vehicle 10, as shown in FIGS. 5, 20 and 21. Also, the accessory attachment member 220 has a C-shaped cross-section forming a recess channel 221 in this example, but can have any desired cross-section.

In this example, a plurality of mounting structures 222 are spaced along the reinforcement member 200 and extend through the vehicle floor 16 to couple the accessory attachment member 220 to the reinforcement member 200. At least one of the mounting structures 222 includes a welded member 224 that is attached by a weld to a surface 226 of the reinforcement member 200 facing away from the vehicle floor 16, and aligned with a fastening aperture 228 formed in the reinforcement member 200 through which a portion 230 of the at least one of the mounting structures 222 passes. In this example, the portion 230 can include a screw that threadedly engages with the welded member 224. Alternatively, the portion 230 can include rivets or any other suitable fasteners. Furthermore, a spacer 231 can be present between the bottom surface 233 of the accessory attachment member 220 and interior floor surface 20 as indicated to position the accessory attachment member 220 at the appropriate height above the interior floor surface 20. The portion 230 of the mounting structure 222 passes through an opening 234 in the spacer 231. The spacer 231 can be arranged as individual spacers present at each of the mounting structure locations, or a continuous spacer that extends along all or a portion of the accessory attachment member 220 and has openings through which the respective portions 230 of the mounting structure 222 can pass.

Since the accessory attachment member 220 has a C-shaped cross section in this example, the accessory attachment member 220 has a horizontally extending portion 232 that extends in a horizontal direction of the vehicle 10, and at least one vertical portion 235 that extends transverse to the horizontally extending portion 232. The plurality of mounting structures 222 couple the horizontally extending portion 232 of the accessory attachment member 220 to the reinforcement member 200. The vertical portions 235 extend in a vertical direction of the vehicle 10 when the accessory attachment member 220 is mounted to the interior floor surface 20. The accessory attachment member 220 further has second horizontally extending portions 236 that extend in a horizontal direction of the vehicle 10 from the vertical portions 234, and the vertical portions 234 space the second horizontally extending portions 236 apart from the horizontally extending portion 232 as shown.

Figure 4:
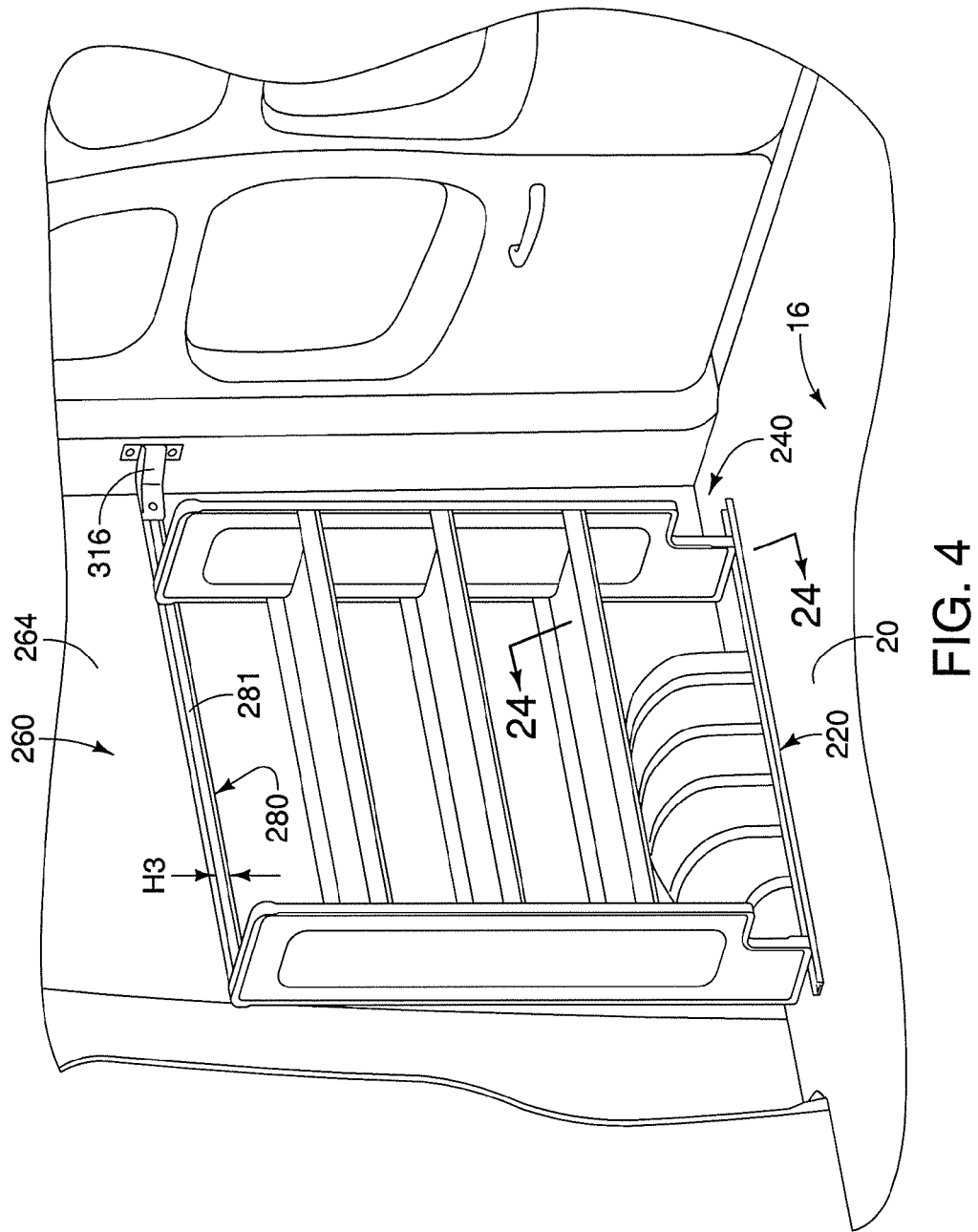
FIG. 4 is an interior perspective view of the rear passenger side of the vehicle illustrated in FIG. 1.
Figure 24:
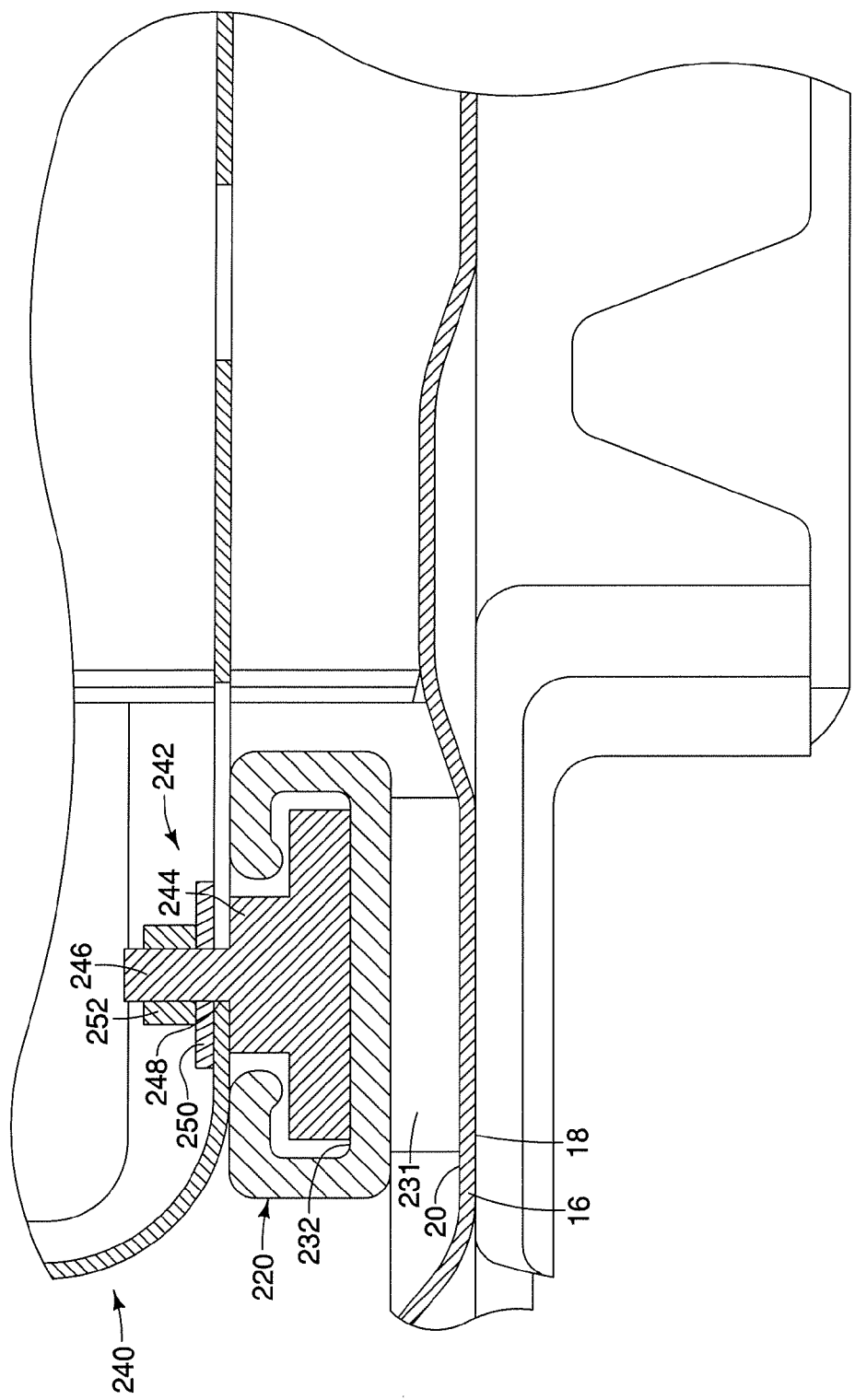
FIG. 24 is a cross-sectional view taken along lines 24-24 in FIG. 4.
Figure 25:
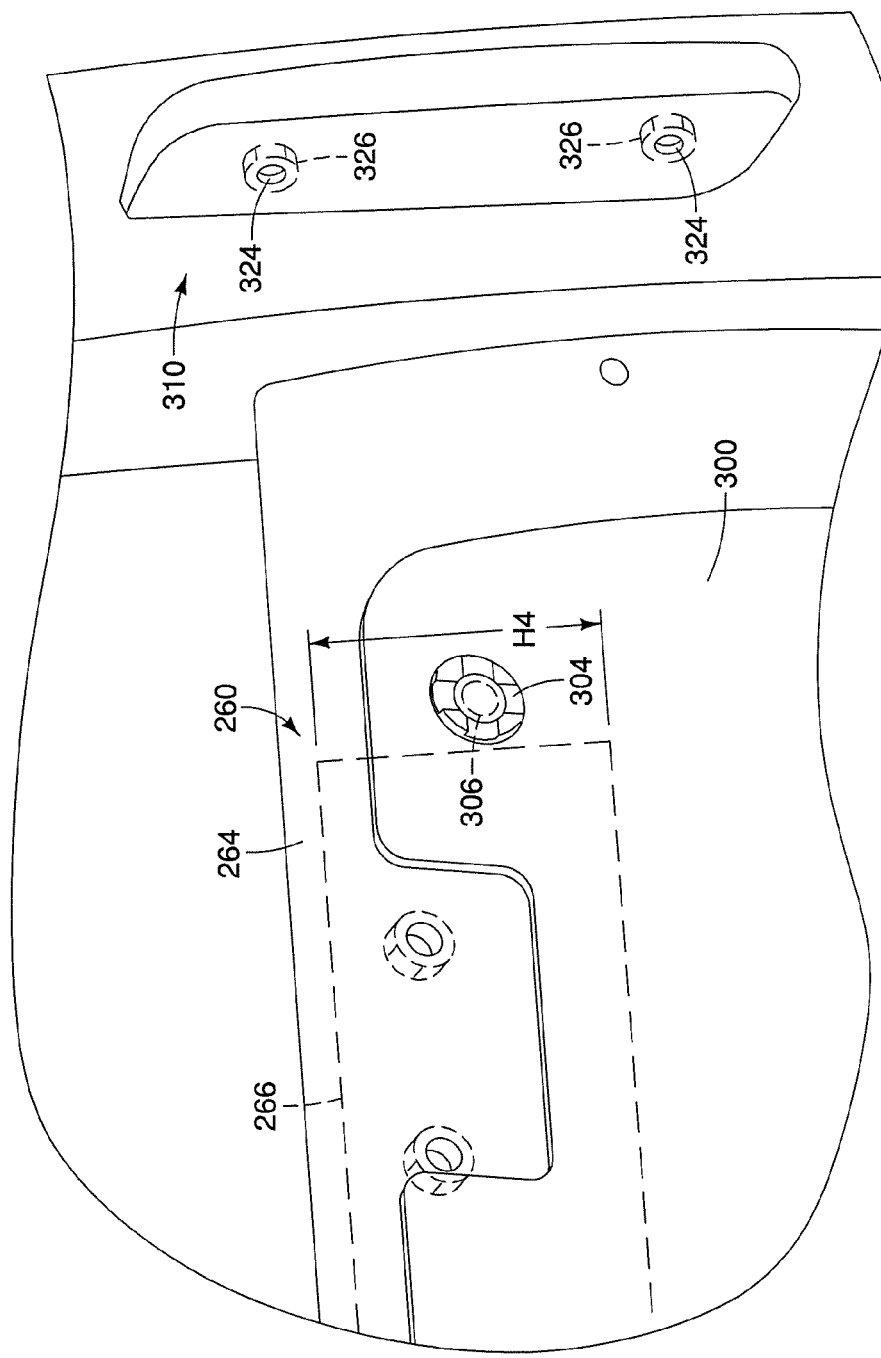
FIG. 25 is a detailed interior perspective view of the rear corner located on the rear passenger side of the vehicle illustrated in FIG. 1 without accessory attachment members installed.
Figure 26:
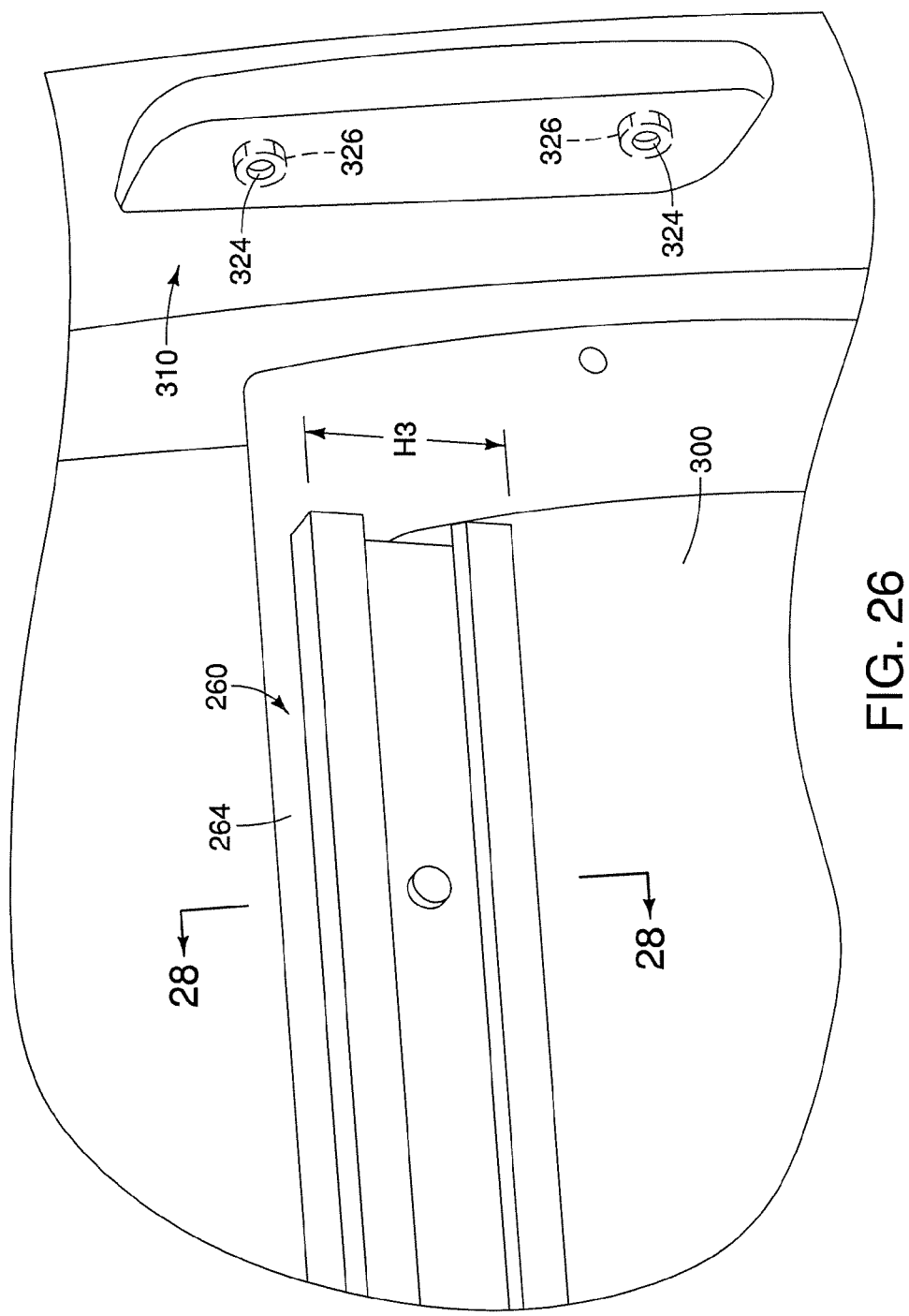
FIG. 26 is a detailed interior perspective view of the rear corner located on the rear passenger side of the vehicle illustrated in FIG. 1 with certain accessory attachment members installed.
Figure 27:
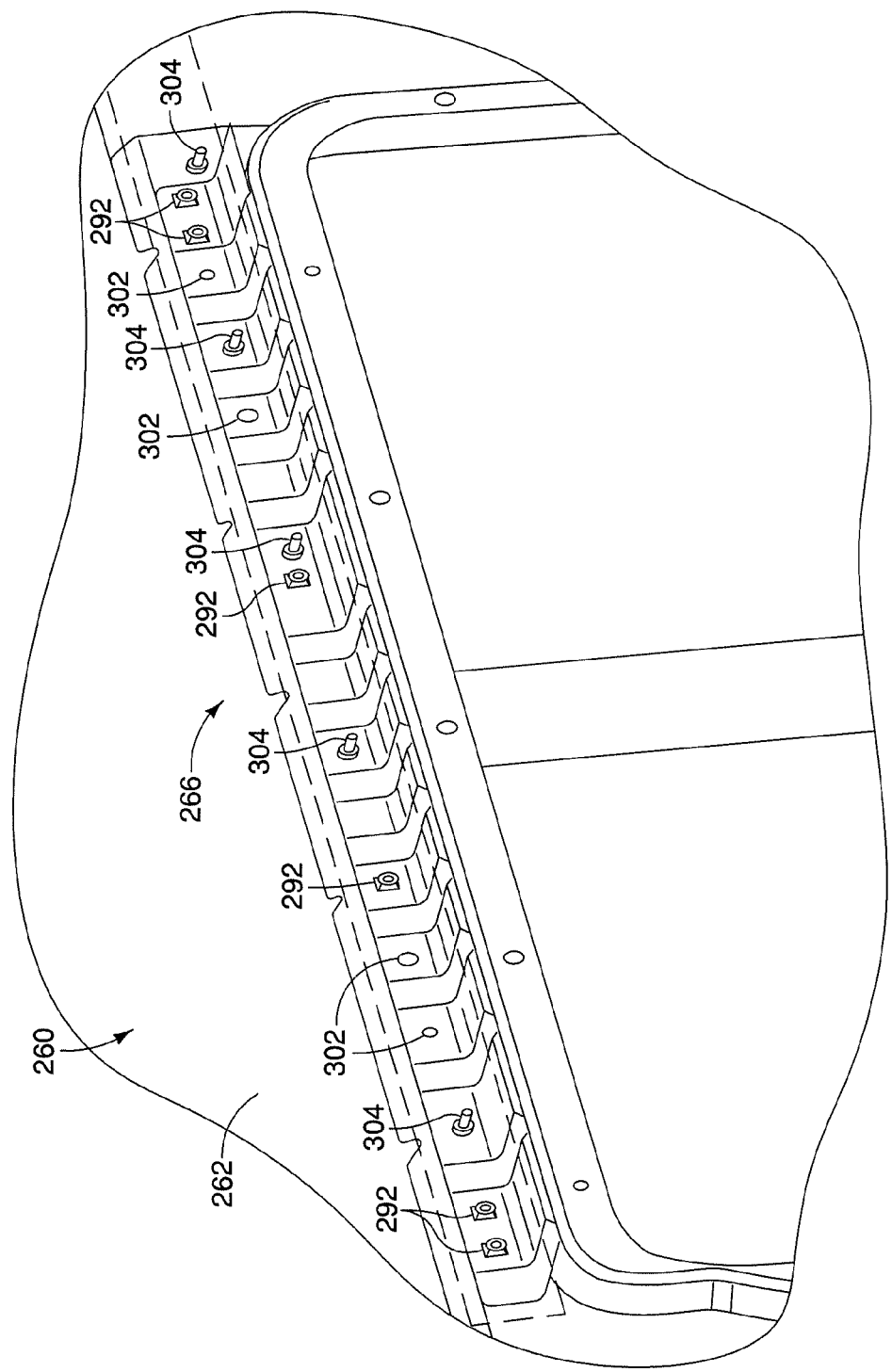
FIG. 27 is a detailed interior perspective view of the rear corner located on the rear passenger side of the vehicle illustrated in FIG. 26 as viewed looking inboard toward the vehicle interior from behind the interior wall of the vehicle.
Figure 28:
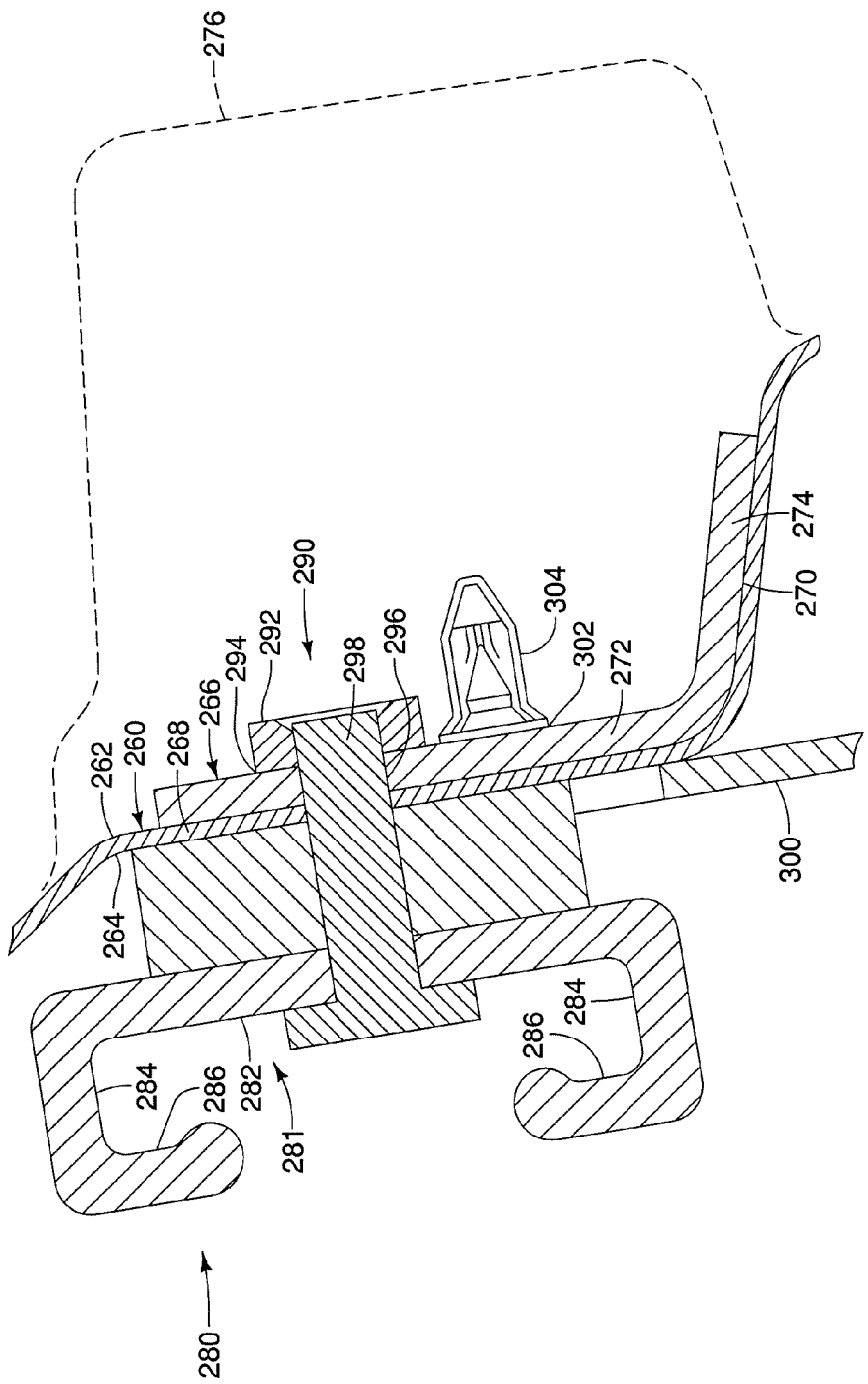
FIG. 28 is a cross-sectional view taken along lines 28-28 in FIG. 26.
Figure 29:
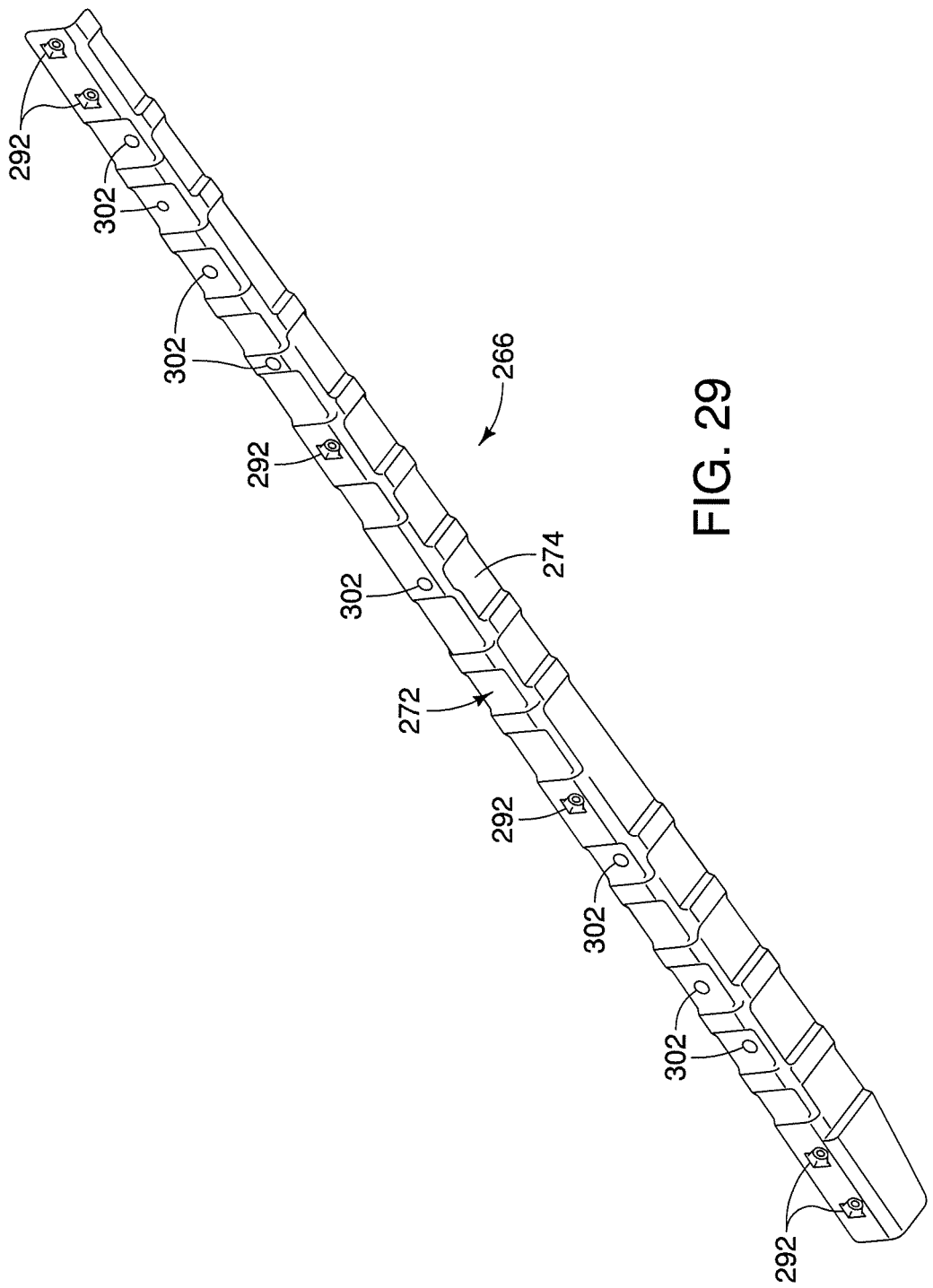
FIG. 29 is a detailed perspective view of a reinforcement member mounted at the rear passenger side of the vehicle as shown in FIGS. 25, 27 and 28.
Figure 30:
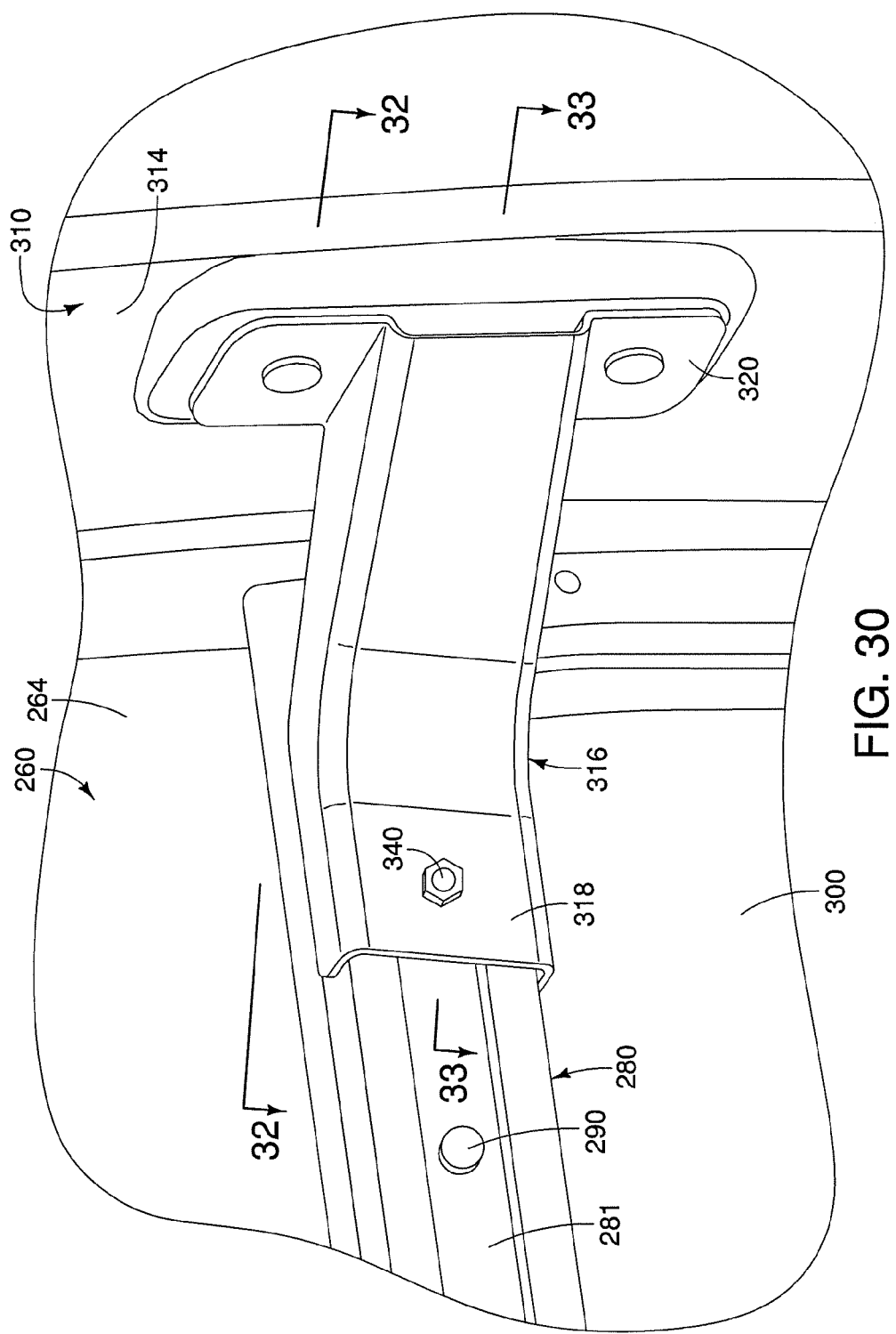
FIG. 30 is a detailed interior perspective view of the rear corner located on the rear passenger side of the vehicle illustrated in FIG. 1 with accessory attachment members installed.
Figure 31:
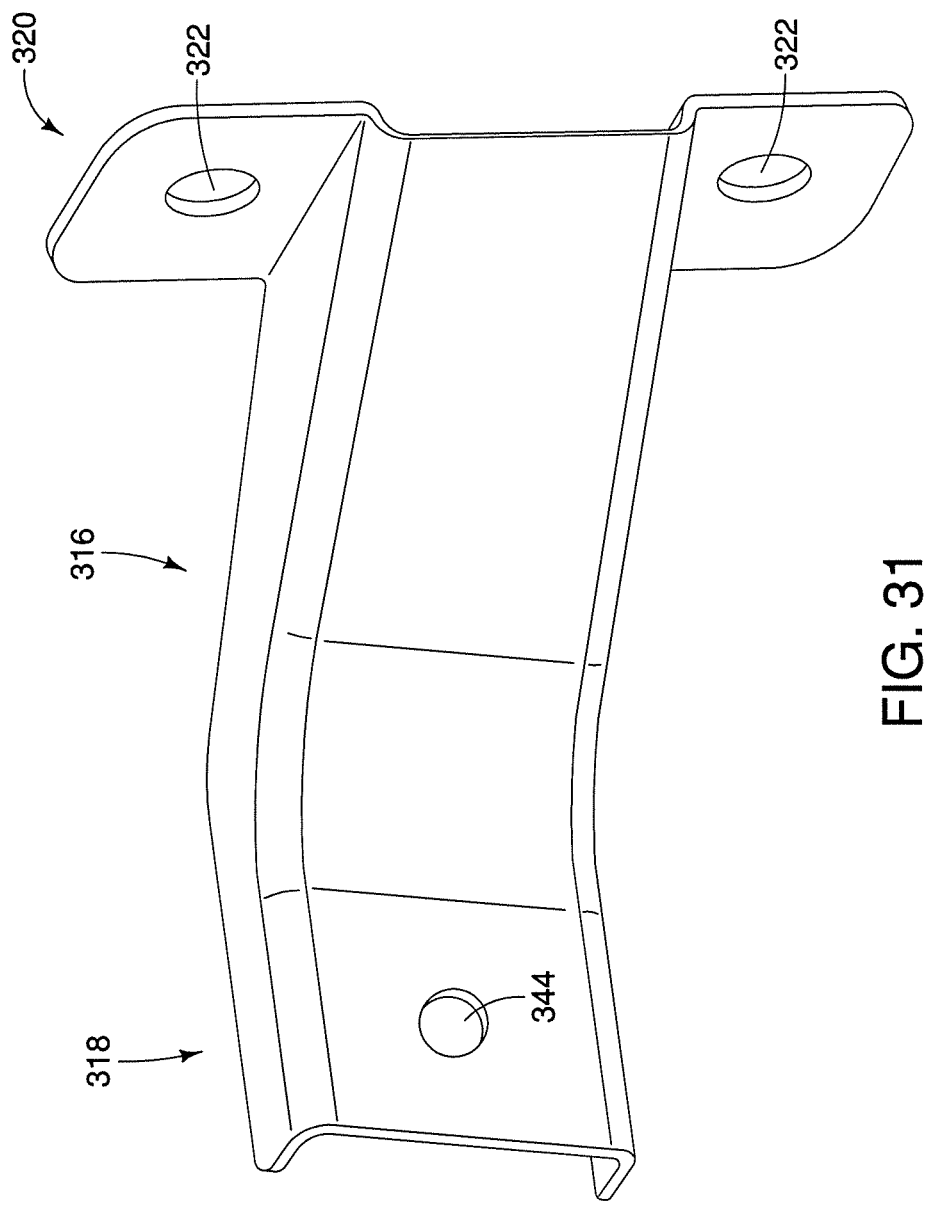
FIG. 31 is a detailed perspective view of an accessory attachment member that mounts to the interior rear corner located on the rear passenger side of the vehicle as shown in FIG. 30.
Figure 32:
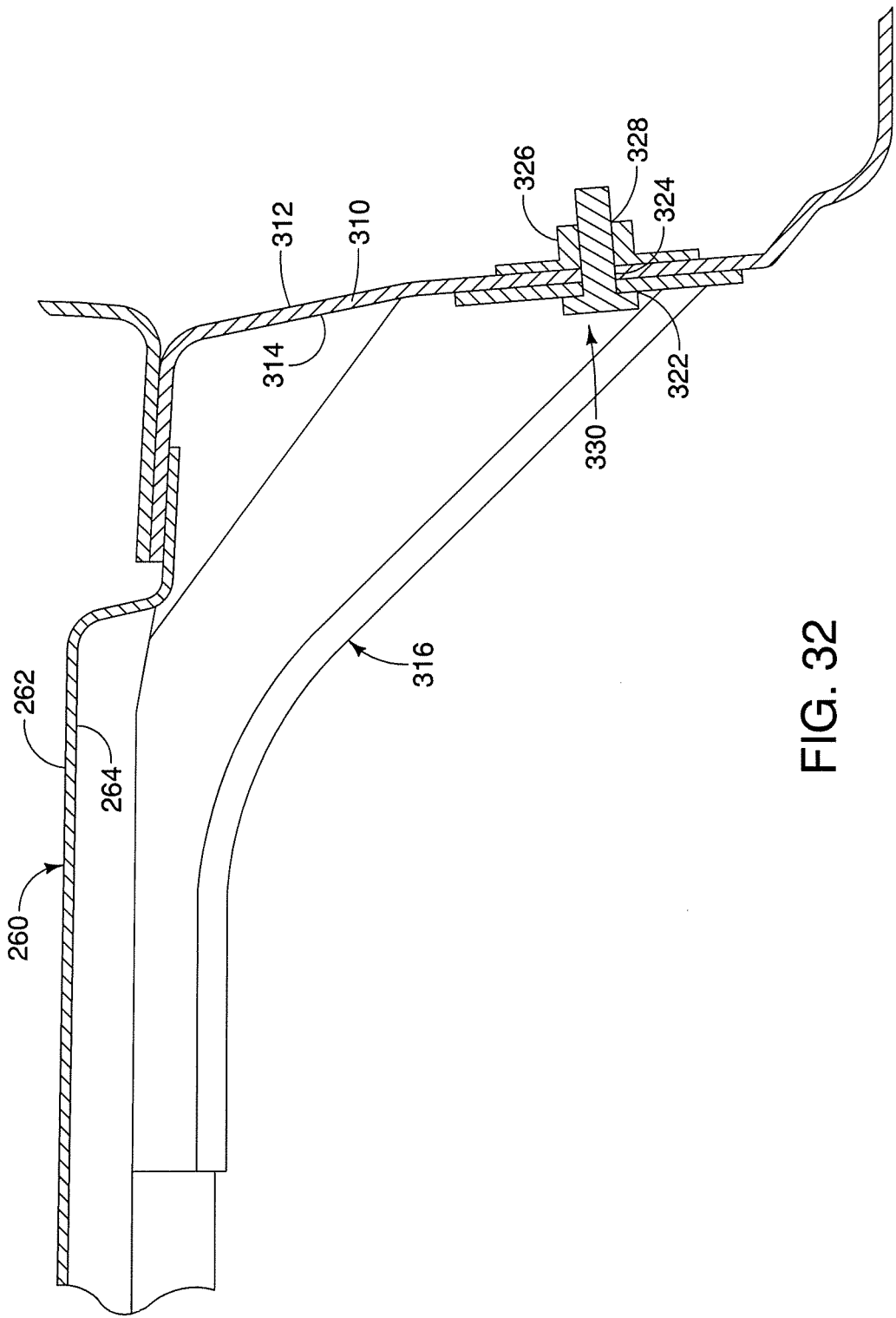
FIG. 32 is a cross-sectional view taken along lines 32-32 in FIG. 30.
Figure 33:
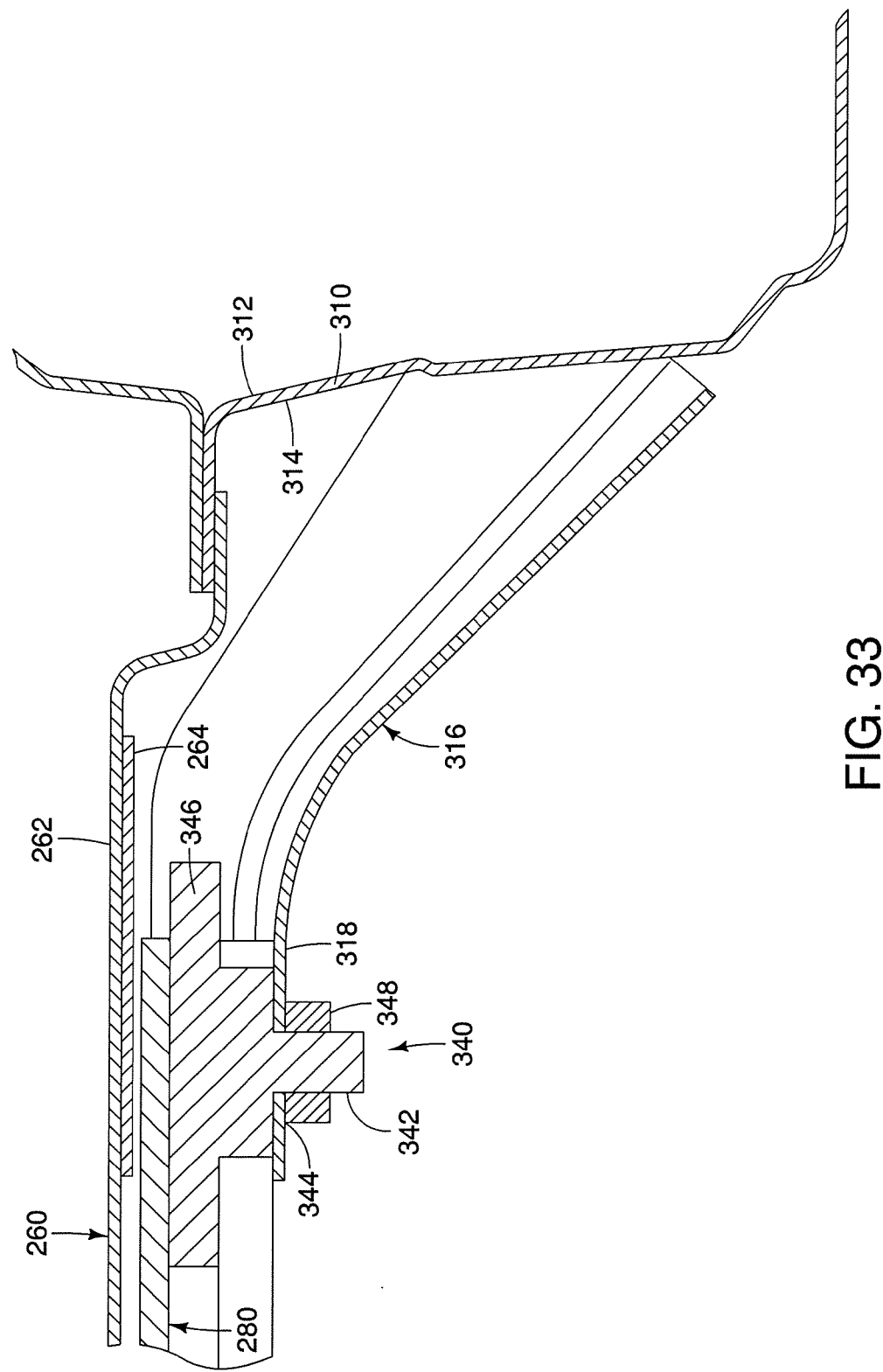
FIG. 33 is a cross-sectional view taken along lines 33-33 in FIG. 30.

As further illustrated in FIGS. 4 and 24, for example, the accessory attachment member 220 is further configured to couple to a shelving member 240 to secure the shelving member 240 inside the vehicle 10. The shelving member 240 can be made of metal or any other suitable material. As shown in FIG. 24, a connecting member 242 includes a coupling member 244 that rests on the horizontally extending portion 232 of the accessory attachment member 220, is slidably received in the opening formed by the C-shaped cross section of the accessory attachment member 220, and is retained by the second horizontally extending portions 236. An extension portion 246 of the coupling member 244 passes through an opening 248 in the shelving member 240. A washer 250, and nut 252 that is threadedly secured to the extension portion 246, secures the shelving member 240 to the accessory attachment member 220 in this example. However, any suitable type of connector, such as a screw, snap fit connection, and so on can be used to secure the shelving member 240 to the accessory attachment member 220.

The portion of the reinforced vehicle structure 12 at the rear passenger side of the vehicle 10 includes a third vehicle wall 260 having an outer wall surface 262 facing an outboard direction of the vehicle 10 and an inner wall surface 264 facing an inboard direction of the vehicle 10. The third vehicle wall 260 is made of a metal typically used in automotive manufacture or any other suitable material. A reinforcement member 266 is mounted to the outer wall surface 242 by welding, riveting, screws, or any other suitable fasteners. The reinforcement member 266 is also made of a metal that can be the same as the metal of third vehicle wall 260, or any other suitable metal or material. In this example, the reinforcement member 266 has a length substantially equal to that of the third vehicle wall 260 extending in a longitudinal direction of the vehicle 10.

A portion of the outer wall surface 242 of the third vehicle wall 260 has a first shape and the reinforcement member 266 has a second shape substantially corresponding to the first shape to enable the reinforcement member 266 to mate with the portion of the outer wall surface 262 when the reinforcement member 266 is mounted to the outer wall surface 262. In this example, the third vehicle wall 260 includes a wall upright portion 268 that includes the inner and outer wall surfaces 264 and 262, respectively, and a wall lateral portion 270 extending outboard from the upright portion 268. Furthermore, the reinforcement member 266 includes a reinforcement upright portion 272 and a reinforcement lateral portion 274 extending outboard from the reinforcement upright portion 272. The reinforcement upright portion 272 and reinforcement lateral portion 274 are positioned proximate to the wall upright portion 268 and wall lateral portion 270, respectively, when the reinforcement member 276 is mounted to the outer wall surface 262 of the third vehicle wall 260. Also, the reinforcement member 266 can be mounted proximate to a roof rail 276 of the vehicle 10 when the reinforcement member 266 is mounted to the outer wall surface 262.

An accessory attachment member 280 is mounted inside the cargo compartment 14 to the inner wall surface 264 at an upper portion of the third vehicle wall 260 in this example. The accessory attachment member 280 is made of a metal, such as that of third vehicle wall 260 or reinforcement member 266, or any other suitable metal or material. In this example, the accessory attachment member 280 has a height H3 extending in a vertical direction of the vehicle 10, and the reinforcement member 276 has a height H4 extending in the vertical direction that is greater than the height H3.

Furthermore, the accessory attachment member 280 in this example has a C-shaped cross-section forming a recess channel 281 therein. That is, the accessory attachment member 280 has a vertically extending portion 282 that extends in a generally vertical direction of the vehicle 10, and at least one horizontal portion 284 that extends transverse to the vertically extending portion 282. Specifically, the horizontal portions 284 extend in a generally inboard direction of the vehicle 10 when the accessory attachment member 280 is mounted to the inner wall surface 264. The accessory attachment member 280 further has second vertically extending portions 286 that extend in a generally vertical direction of the vehicle 10 from the horizontal portions 284. Accordingly, the horizontal portions 284 space the second vertically extending portions 286 apart from the vertically extending portion 282.

A plurality of mounting structures 290 are spaced along the reinforcement member 266 and extend through the third vehicle wall 260 to couple the accessory attachment member 280 to the reinforcement member 266. At least one of the mounting structures 290 includes a welded member 292 that is attached by a weld to a surface 294 of the reinforcement member 266 facing away from the third vehicle wall 260. The welded member 292 is aligned with a fastening aperture 296 formed in the reinforcement member 266 through which a portion 298 of the mounting structure 290 passes. In this example, the portion 298 of the mounting structure 290 can include a bolt that is threadedly secured to the welded member 292 to secure the accessory attachment member 280 to the reinforcement member 266. However, the portion 298 of the mounting structure 290 can include a rivet, screw or any other suitable type of fastener. In this example, the plurality of mounting structures 290 couple the vertically extending portion 282 of the accessory attachment member 280 to the reinforcement member 266.

As further illustrated, a trim member 300, such as an interior trim panel of a type that is typically present in vehicles, is disposed proximate to the inner wall surface 264. In this example, the accessory attachment member 280 is mounted to the inner wall surface 264 such that the trim member 300 that is disposed proximate to the inner wall surface 264 is positioned between the accessory attachment member 280 and the third vehicle wall 260. Furthermore, the reinforcement member 266 includes at least one fastening aperture 302 that receives a portion of a mounting member 304 of the trim member 300 that passes through an opening 306 in the third vehicle wall 260. However, the trim member 300 can be secured proximate to the third vehicle wall 260 in any suitable manner.

As further illustrated in FIGS. 3 and 24, for example, the accessory attachment member 280 is further configured to couple to the shelving member 240 to further secure the shelving member 240 inside the vehicle 10. A connecting member (not shown) similar to connecting member 242 as discussed above can be slidably received in the opening formed by the C-shaped cross section of the accessory attachment member 280, and is coupled to the shelving member 240 in a manner similar to connecting member 242 to secure the shelving member 240 to the accessory attachment member 280 in this example. However, any suitable type of connector, such as a screw, snap fit connection, and so on can be used to secure the shelving member 240 to the accessory attachment member 280.

As further shown, for example, in FIGS. 2, 3, 26, 27 and 30-33, the reinforced vehicle structure 12 can further include a fourth vehicle wall 310 extending transverse to the third vehicle wall 260. The fourth vehicle wall 310 includes a fourth outer wall surface 312 facing an exterior of the vehicle 10 and a fourth inner wall surface 314 facing an interior of the vehicle 10. The reinforced vehicle structure 12 also includes a reinforcement member 316 having a first end 318 mounted to the accessory attachment member 280 and a second end 320 mounted to the fourth inner wall surface 314. The mounted reinforcement member 316 therefore extends in a direction that is not parallel to either of the third and fourth vehicle walls 260 and 310.

As shown in detail in FIGS. 30-33, the second end 320 of the reinforcement member 316 includes a plurality of openings 322 therein. The openings 322 align with openings 324 in the fourth vehicle wall 310. A plurality of reinforcement members 326, such as a welded member, can be attached to the fourth outer wall surface 312 by welding or in any other suitable manner. Each reinforcement member 326 can include an opening 328 therein that is aligned with an opening 324 in the fourth vehicle wall 310. Accordingly, a coupling structure 330, such as a bolt, can pass through each of the openings 322 in the second end 320 of the reinforcement member 316 and the openings 324 in the fourth vehicle wall 310, and threadedly engage with the openings 328 in the reinforcement member 326 to couple the second end 320 of the reinforcement member 316 to the fourth inner wall surface 314 of the fourth vehicle wall 310.

With regard to the first end 318 of the reinforcement member 316, as illustrated, a coupling member 340 couples the first end 318 of the reinforcement member 316 to the accessory attachment member 280. As discussed above, the accessory attachment member 280 has a C-shaped cross-section defining a recess channel 281. The coupling member 340 has a first coupling end 342 that passes through an opening 344 in the first end 318 of the reinforcement member 316 and a second coupling end 346 that couples to the accessory attachment member 280. That is, the first coupling end 342 can threadedly engage with a nut 348 to secure the coupling member 340 to the first end 318 of the reinforcement member 316. The second coupling end 346 is received in the recess of the accessory attachment member 280 to couple the first end 318 of the reinforcement member 316 to the accessory attachment member 280.

Accordingly, as can be appreciated from the above, the embodiments of the reinforcement vehicle structure described herein includes a reinforcement member or panel configured to reinforce an area of a vehicle body at a location where an extended accessory track may be installed on an interior surface of the vehicle. The reinforcement member is attached to a side of a body panel that is opposite from the accessory track and conforms or substantially conforms to the shape of the body panel so as to effect an increase in the thickness and rigidity of the body panel. The reinforcement member also includes attachment points for the accessory track, as well as other vehicle equipment or interior trim components, such as spaced-apart nut welds having threaded apertures accessible from the interior surface of the vehicle. The reinforcement member may also include other threaded or non-threaded mounting apertures. The reinforcement assembly thus provides increased stress resistance and rigidity in order to accommodate all kinds of foreseeable uses of an accessory track by customers.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiments, the following directional terms "forward", "rearward", "above", "downward", "vertical", "horizontal", "below" and "transverse" as well as any other similar directional terms refer to those directions of a vehicle equipped with the reinforced vehicle structure. Accordingly, these terms, as utilized to describe the present invention should be interpreted relative to a vehicle equipped with the reinforced vehicle structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments of the present invention are provided for illustration only, and not for the purpose of limiting the invention as defined by the appended claims and their equivalents.

What is claimed is:

1. A reinforced vehicle structure comprising:
   a vehicle wall having an outer wall surface facing an outboard direction of a vehicle and an inner wall surface facing an inboard direction of the vehicle, the vehicle including a cargo compartment;
   a reinforcement member mounted to the outer wall surface;
   an accessory attachment member mounted inside the cargo compartment to the inner wall surface of the vehicle wall; and
   a plurality of mounting structures spaced along the reinforcement member and extending through the vehicle wall to couple the accessory attachment member to the reinforcement member.

2. The reinforced vehicle structure according to claim 1, wherein
   the accessory attachment member has a first height extending in a vertical direction of the vehicle, and the reinforcement member has a second height extending in the vertical direction that is greater than the first height.

3. The reinforced vehicle structure according to claim 1, wherein
   the accessory attachment member is mounted to the inner wall surface at an upper portion of the vehicle wall.

4. The reinforced vehicle structure according to claim 1, wherein
   at least one of the mounting structures includes a welded member that is attached by a weld to a surface of the reinforcement member facing away from the vehicle wall, and that is aligned with a fastening aperture formed in the reinforcement member through which a portion of the at least one of the mounting structures passes.

5. The reinforced vehicle structure according to claim 1, wherein
   the accessory attachment member is mounted to the inner wall surface such that a trim member that is disposed proximate to the inner wall surface is positioned between the accessory attachment member and the vehicle wall.

6. The reinforced vehicle structure according to claim 5, wherein
   the reinforcement member includes at least one fastening aperture that receives a portion of a mounting member of the trim member that passes through the vehicle wall.

7. The reinforced vehicle structure according to claim 1, wherein
   the accessory attachment member has a C-shaped cross-section.

8. The reinforced vehicle structure according to claim 1, wherein
   the vehicle wall includes a wall upright portion that includes the inner and outer wall surfaces, and a wall lateral portion extending outboard from the wall upright portion; and
   the accessory attachment member is mounted to the wall upright portion.

9. The reinforced vehicle structure according to claim 8, wherein
   the wall upright and wall lateral portions of the vehicle wall define a first shape and the reinforcement member has a second shape substantially corresponding to the first shape to enable the reinforcement member to mate with the portion of the outer wall surface when the reinforcement member is mounted to the outer wall surface.

10. The reinforced vehicle structure according to claim 8, wherein
    the reinforcement member includes a reinforcement upright portion and a reinforcement lateral portion extending outboard from the reinforcement upright portion, such that the reinforcement upright portion and reinforcement lateral portion are positioned proximate to the wall upright portion and wall lateral portion, respectively, when the reinforcement member is mounted to the outer wall surface of the vehicle wall.

11. The reinforced vehicle structure according to claim 1, further comprising
    a second vehicle wall located on a side of the vehicle opposite to the vehicle wall, and having a second outer wall surface facing an outboard direction of the vehicle and a second inner wall surface facing an inboard direction of the vehicle;
    a second reinforcement member mounted to the second outer wall surface;
    a second accessory attachment member mounted to the second inner wall surface; and
    a plurality of second mounting structures spaced along the second reinforcement member and extending through the second vehicle wall to couple the second accessory attachment member to the second reinforcement member.

12. The reinforced vehicle structure according to claim 11, wherein
the vehicle includes a cargo compartment, and the accessory attachment member and second accessory attachment member are mounted inside the cargo compartment to the inner wall surface and second inner wall surface, respectively.

13. The reinforced vehicle structure according to claim 1, wherein
the reinforcement member is mounted proximate to a roof rail of the vehicle when the reinforcement member is mounted to the outer wall surface.

14. The reinforced vehicle structure according to claim 1, wherein
the accessory attachment member has a vertically extending portion that extends in a vertical direction of the vehicle, and at least one horizontal portion having a first end that extends transverse to and away from the vertically extending portion.

15. The reinforced vehicle structure according to claim 14, wherein
the plurality of mounting structures couple the vertically extending portion of the accessory attachment member to the reinforcement member.

16. The reinforced vehicle structure according to claim 14, wherein
the at least one horizontal portion extends away from the vertically extending portion in an inboard direction of the vehicle when the accessory attachment member is mounted to the inner wall surface.

17. The reinforced vehicle structure according to claim 14, wherein
the accessory attachment member further has a second vertically extending portion that extends in a vertical direction of the vehicle from a second end of the at least one horizontal portion, and the at least one horizontal portion spaces the second vertically extending portion apart from the vertically extending portion.

18. A reinforced vehicle structure comprising:
a vehicle wall having an outer wall surface facing an outboard direction of a vehicle and an inner wall surface facing an inboard direction of the vehicle;
a reinforcement member mounted to the outer wall surface, the reinforcement member having a length substantially equal to that of the vehicle wall extending in a longitudinal direction of the vehicle;
an accessory attachment member mounted to the inner wall surface; and
a plurality of mounting structures spaced along the reinforcement member and extending through the vehicle wall to couple the accessory attachment member to the reinforcement member.

19. The reinforced vehicle structure according to claim 18, wherein
the vehicle includes a cargo compartment, and the accessory attachment member is mounted inside the cargo compartment to the inner wall surface of the vehicle wall.

20. A reinforced vehicle structure comprising:
a vehicle wall having an outer wall surface facing an outboard direction of a vehicle and an inner wall surface facing an inboard direction of the vehicle;
a reinforcement member mounted to the outer wall surface;
an accessory attachment member mounted to the inner wall surface, the accessory attachment member being further configured to couple to a shelving member to secure the shelving member inside the vehicle; and
a plurality of mounting structures spaced along the reinforcement member and extending through the vehicle wall to couple the accessory attachment member to the reinforcement member.

* * * * *